US012063133B2

(12) United States Patent
Drogi et al.

(10) Patent No.: US 12,063,133 B2
(45) Date of Patent: *Aug. 13, 2024

(54) FAST ANTENNA SWAPPING

(71) Applicant: Skyworks Solutions, Inc., Irvine, CA (US)

(72) Inventors: Serge Francois Drogi, Flagstaff, AZ (US); David Steven Ripley, Marion, IA (US); Dominique Michel Yves Brunel, Antibes (FR)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/839,077

(22) Filed: Jun. 13, 2022

(65) Prior Publication Data

US 2022/0407571 A1    Dec. 22, 2022

Related U.S. Application Data

(60) Provisional application No. 63/210,131, filed on Jun. 14, 2021, provisional application No. 63/210,132, filed on Jun. 14, 2021, provisional application No. 63/210,133, filed on Jun. 14, 2021.

(51) Int. Cl.
*H04L 27/26* (2006.01)
*H04B 7/06* (2006.01)
*H04L 5/00* (2006.01)

(52) U.S. Cl.
CPC ........ *H04L 27/2613* (2013.01); *H04B 7/0602* (2013.01); *H04B 7/0604* (2013.01); *H04L 5/0048* (2013.01); *H04L 5/0051* (2013.01); *H04L 27/2605* (2013.01)

(58) Field of Classification Search
CPC ..... H04B 7/0602; H04B 7/0604; H04L 5/001; H04L 5/0023; H04L 5/0048; H04L 5/0051; H04L 27/26035; H04L 27/2605; H04L 27/2607; H04L 27/2613
See application file for complete search history.

(56) References Cited

U.S. PATENT DOCUMENTS 6,646,510 B2  11/2003  Julien et al.
6,895,232 B2   5/2005  Parker
8,274,931 B2   9/2012  Pajukoski et al.
(Continued)

OTHER PUBLICATIONS

R1-2100068, Discussion on SRS Enhancements, InterDigital, Inc., 3GPP TSG RAN WG1 #103-e, e-Meeting, Jan. 25-Feb. 5, 2021, in 8 pages.
(Continued)

*Primary Examiner* — David B Lugo
(74) *Attorney, Agent, or Firm* — Knobbe, Martens, Olson & Bear, LLP

(57) ABSTRACT

Apparatus and methods for sounding reference signal (SRS) switching are provided. In certain embodiments, a controller internal to the power amplifier module initiates a sequence of instructions, in response to a single command from UE. The instructions cause a reduction in gain of the power amplifier, and initiate a delay. The antennas switch actuates after the delay to switch from a first antenna to a second antenna. The teachings herein can be used to avoid overpower on the power amplifier and antenna switch.

20 Claims, 21 Drawing Sheets

(56) References Cited

U.S. PATENT DOCUMENTS

| | | | |
|---|---|---|---|
| 8,295,153 B2 | 10/2012 | Nentwig et al. | |
| 8,441,999 B2 | 5/2013 | Xiao et al. | |
| 9,060,363 B2 | 6/2015 | Xiao et al. | |
| 9,154,277 B2 | 10/2015 | Ekpenyong et al. | |
| 9,628,140 B2 | 4/2017 | Xie et al. | |
| 9,780,901 B2 | 10/2017 | Cheng et al. | |
| 9,848,424 B2 | 12/2017 | Wang et al. | |
| 10,021,573 B2 | 7/2018 | Chou et al. | |
| 10,091,766 B2 | 10/2018 | Chen et al. | |
| 10,225,836 B2 | 3/2019 | Wang et al. | |
| 10,263,758 B2 | 4/2019 | Lee et al. | |
| 10,403,955 B2 | 9/2019 | Srirattana et al. | |
| 10,425,973 B2 | 9/2019 | Patel et al. | |
| 10,470,205 B2 | 11/2019 | Parkvall et al. | |
| 10,581,466 B2 | 3/2020 | Pehlke | |
| 10,659,121 B2 | 5/2020 | Pehlke | |
| 10,700,908 B2 | 6/2020 | Baldemair et al. | |
| 10,749,562 B2 | 8/2020 | Bai | |
| 10,826,661 B2 | 11/2020 | Miao et al. | |
| 10,985,784 B2 | 4/2021 | King | |
| 11,245,552 B2 | 2/2022 | Brunel et al. | |
| 11,601,247 B2 | 3/2023 | Brunel et al. | |
| 2009/0054093 A1 | 2/2009 | Kim et al. | |
| 2012/0014349 A1 | 1/2012 | Chung et al. | |
| 2012/0113967 A1 | 5/2012 | Smith et al. | |
| 2012/0201149 A1 | 8/2012 | Skärby et al. | |
| 2013/0182674 A1 | 7/2013 | Lunttila et al. | |
| 2014/0241242 A1 | 8/2014 | Josiam et al. | |
| 2014/0254726 A1 | 9/2014 | Kim et al. | |
| 2014/0341179 A1 | 11/2014 | Yokomakura et al. | |
| 2015/0003370 A1 | 1/2015 | Yokomakura et al. | |
| 2015/0294815 A1* | 10/2015 | Acker | H01H 9/161 307/29 |
| 2015/0326285 A1 | 11/2015 | Zirwas et al. | |
| 2016/0142190 A1 | 5/2016 | Lunttila et al. | |
| 2016/0270087 A1 | 9/2016 | Soriaga et al. | |
| 2016/0365908 A1 | 12/2016 | Chang et al. | |
| 2017/0055256 A1 | 2/2017 | Zhang | |
| 2017/0180094 A1 | 6/2017 | Wu et al. | |
| 2018/0103433 A1 | 4/2018 | Li et al. | |
| 2018/0205530 A1 | 7/2018 | Pehlke | |
| 2018/0368078 A1 | 12/2018 | Vintola et al. | |
| 2019/0044678 A1 | 2/2019 | Liu et al. | |
| 2019/0068127 A1 | 2/2019 | Ishikawa et al. | |
| 2019/0109689 A1 | 4/2019 | Huang et al. | |
| 2019/0158332 A1 | 5/2019 | Akkarakaran et al. | |
| 2019/0165469 A1 | 5/2019 | Loui et al. | |
| 2019/0200353 A1 | 6/2019 | Wang et al. | |
| 2019/0238305 A1 | 8/2019 | Lee et al. | |
| 2019/0253214 A1 | 8/2019 | Liu et al. | |
| 2019/0288808 A1 | 9/2019 | Baldemair et al. | |
| 2019/0349098 A1 | 11/2019 | Jiang et al. | |
| 2019/0349237 A1 | 11/2019 | Baldemair et al. | |
| 2020/0177339 A1 | 6/2020 | Hessler et al. | |
| 2020/0213066 A1 | 7/2020 | Ma et al. | |
| 2020/0220506 A1 | 7/2020 | Choi et al. | |
| 2020/0274671 A1 | 8/2020 | Behravan et al. | |
| 2020/0275431 A1 | 8/2020 | Bae et al. | |
| 2020/0288433 A1 | 9/2020 | Yu et al. | |
| 2020/0296656 A1 | 9/2020 | Amuru et al. | |
| 2020/0313760 A1* | 10/2020 | Laws | H04B 7/18517 |
| 2020/0343981 A1 | 10/2020 | Garcia et al. | |
| 2020/0350970 A1 | 11/2020 | Liu et al. | |
| 2020/0366532 A1 | 11/2020 | Brunel et al. | |
| 2021/0021391 A1 | 1/2021 | Wang et al. | |
| 2021/0022006 A1* | 1/2021 | Sun | H04W 72/23 |
| 2021/0067209 A1 | 3/2021 | Gopal et al. | |
| 2021/0083825 A1 | 3/2021 | Choi et al. | |
| 2021/0105724 A1 | 4/2021 | Huang et al. | |
| 2021/0105810 A1 | 4/2021 | Shen et al. | |
| 2021/0107542 A1 | 4/2021 | Cross et al. | |
| 2021/0109145 A1 | 4/2021 | Haustein et al. | |
| 2021/0159962 A1* | 5/2021 | Zhang | H04L 5/0051 |
| 2021/0242582 A1* | 8/2021 | Marr, Jr. | G01S 7/032 |
| 2021/0367724 A1 | 11/2021 | Zhang et al. | |
| 2022/0065927 A1 | 3/2022 | De Godoy et al. | |
| 2022/0069846 A1 | 3/2022 | Loh et al. | |
| 2022/0123965 A1 | 4/2022 | Brunel et al. | |
| 2022/0201696 A1 | 6/2022 | Go et al. | |
| 2022/0231710 A1 | 7/2022 | Pehlke | |
| 2022/0239430 A1 | 7/2022 | Jayaraman et al. | |
| 2022/0407572 A1 | 12/2022 | Drogi et al. | |
| 2022/0407755 A1 | 12/2022 | Drogi et al. | |
| 2023/0047048 A1 | 2/2023 | Liu et al. | |
| 2023/0109687 A1* | 4/2023 | Frank | H04B 7/0465 375/267 |
| 2023/0163728 A1 | 5/2023 | Jain et al. | |
| 2023/0163918 A1 | 5/2023 | Brunel et al. | |
| 2023/0223034 A1 | 7/2023 | Kain | |

OTHER PUBLICATIONS

R1-2104580, Discussion on SRS carrier switching, ZTE, 3GPP TSG RAN WG1 Meeting #105-e, e-Meeting, May 10-27, 2021, in 5 pages.

R4-1812719, Further discussion on additional IL caused by SRS switch, OPPO, 3GPP TSG-RAN WG4 Meeting #88bis, China, Oct. 8-12, 2018, in 7 pages.

* cited by examiner

| NUMEROLOGY [μ] | 0 | 1 | 2 | 3 | 4 |
|---|---|---|---|---|---|
| SUBCARRIER SPACING [kHz] | 15 | 30 | 60 | 120 | 240 |
| NUMBER OF SLOTS / SUBFRAME | 1 | 2 | 4 | 8 | 16 |
| OFDM SYMBOL DURATION (1:13)[μs] | 66.67 | 33.33 | 16.67 | 8.33 | 4.17 |
| CYCLIC PREFIX DURATION (1:13)[μs] | 4.69 | 2.34 | 1.17 | 0.57 | 0.29 |
| OFDM SYMBOL INCLUDING CP(1:13)[μs] | 71.35 | 35.68 | 17.84 | 8.92 | 4.46 |
| MINIMUM SCHEDULING INTERVAL[μs] | 1000 | 500 | 250 | 125 | 62.5 |
| SCHEDULING INTERVAL FOR MINI SLOT LENGTH 2 OS[μs] | 142 | 71 | 36 | 18 | 9 |

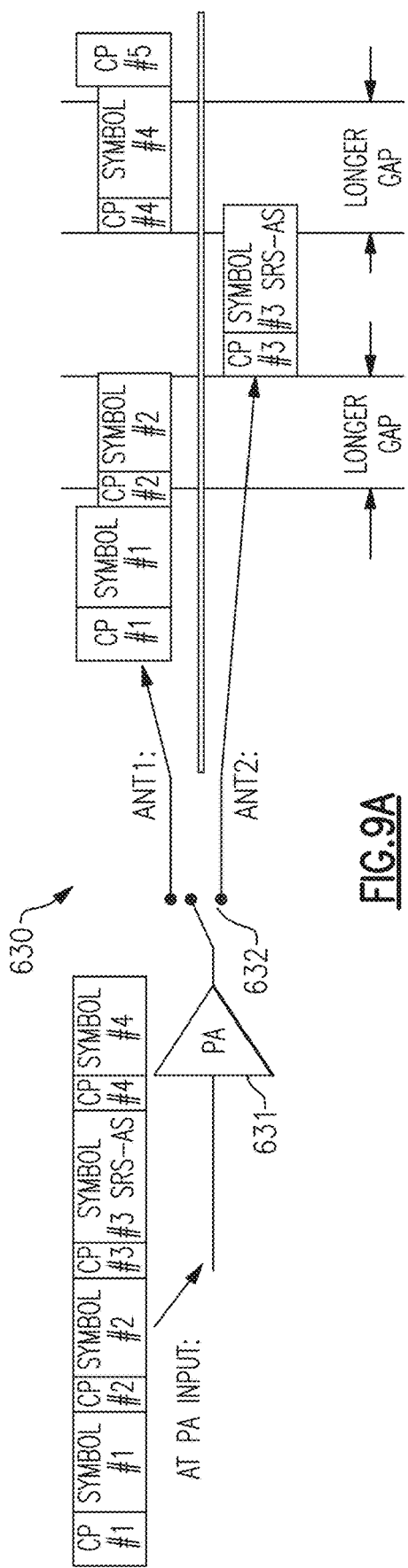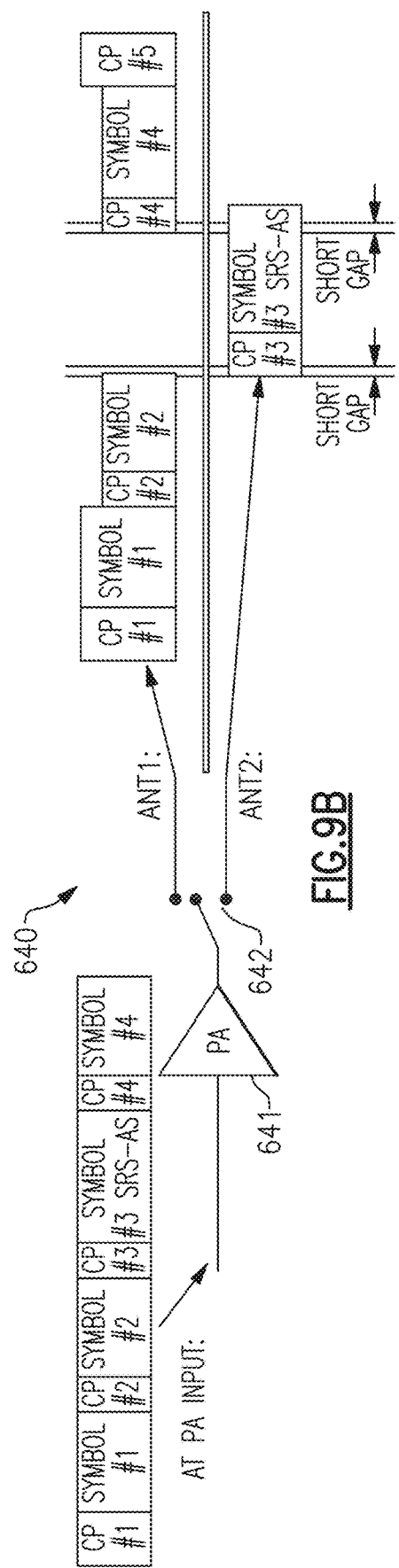

FAST ANTENNA SWAPPING

INCORPORATION BY REFERENCE TO ANY PRIORITY APPLICATIONS

Any and all applications for which a foreign or domestic priority claim is identified in the application data sheet as filed with the present application are hereby incorporated by reference under 37 CFR 1.57.

BACKGROUND

Field

Embodiments disclosed herein relate to electronic systems, and in particular, to radio frequency electronics.

Description of Related Technology

Radio frequency (RF) communication systems can be used for transmitting and/or receiving signals of a wide range of frequencies. For example, an RF communication system can be used to wirelessly communicate RF signals in a frequency range of about 30 kHz to 300 GHz, such as in the range of about 410 MHz to about 7.125 GHz for fifth generation (5G) communications using Frequency Range 1 (FR1).

Examples of RF communication systems include, but are not limited to, mobile phones, tablets, base stations, network access points, customer-premises equipment (CPE), laptops, and wearable electronics.

SUMMARY

In certain embodiments, the present disclosure relates to a method of sounding reference signal switching in a mobile device. The method includes transmitting a sequence of symbols through a power amplifier and antenna switch to a first antenna; in response to receiving a command, reducing gain of the power amplifier and actuating the antenna switch to switch to a second antenna; and transmitting a sounding reference signal symbol on the second antenna without blank symbols inserted into the sequence of symbols.

In a number of embodiments, reducing the gain of the power amplifier includes reducing a bias of one or more stages of the power amplifier.

In several embodiments, reducing the gain of the power amplifier includes placing the power amplifier in a low power mode.

In some embodiments, the method further includes implementing a delay in response to receiving the command.

In various embodiments, the antenna switch actuation occurs after the delay.

In some embodiments, the method further includes re-establishing the gain of the power amplifier after actuating the switch and before transmitting the sounding reference symbol.

In a number of embodiments, the antenna switch actuation occurs between symbols.

In several embodiments, the command is a single command that initiates a self-sequenced mode within a power amplifier module.

In some embodiments, the method further includes receiving a signal from the antenna switch indicating completion of the switch actuation.

In various embodiments, the method further includes diverting an output of the power amplifier to a load while waiting for the antenna switch to settle after actuation.

In certain embodiments, the present disclosure relates to a mobile device. The mobile device includes a baseband system configured to generate a sequence of symbols for transmission and a command for initiating sounding reference signal switching; and a power amplifier module including a switch configured to switch between a first antenna and a second antenna and a power amplifier, the front end module configured to, in response to receiving the command, reduce gain of the power amplifier, switch the switch from the first antenna to the second antenna, and transmit a sounding reference signal symbol on the second antenna without blank symbols inserted into the sequence of symbols for transmission during switching.

In a number of embodiments, reducing the gain of the power amplifier includes shunting one or more amplifier stages of the power amplifier.

In several embodiments, reducing the gain of the power amplifier includes placing the power amplifier in an off mode.

In some embodiments, the power amplifier module further includes a mobile industry processor interface, a bias controller and a switch controller.

In various embodiments, the mobile industry processor interface is configured to receive the command and control the bias controller and the switch controller.

In a number of embodiments, the bias controller is configured to control the gain of one or more stages of the power amplifier in response to a signal from the mobile industry processor interface.

In various embodiments, the switch controller is configured to control actuation of the switch in response to a signal from the mobile industry processor interface.

In certain embodiments, the present disclosure relates to a front end system. The front end system includes a power amplifier configured to provide an amplified radio frequency signal to a first antenna terminal; an antenna switch configured to receive the amplified radio frequency signal and switch between the first antenna terminal and a second antenna terminal; and a controller configured to receive a trigger command and initiate an ordered list of commands that cause reduced power amplifier gain, actuation of the switch, and transmission of a sounding reference signal symbol to the second antenna terminal without blank symbols for transmission during the actuation.

In various embodiments, the controller is a sequence register.

In some embodiments, causing reduced power amplifier gain includes causing reduced bias of one or more stages of the power amplifier.

In certain embodiments, the present disclosure relates to a method of sounding reference signal switching in a mobile device. The method includes transmitting a sequence of symbols using a transmit path through a power amplifier and antenna switch to a first antenna; in response to receiving a single command, reducing gain of the power amplifier, initiating a delay in response to the reduced gain of the power amplifier, and actuating the antenna switch to switch to a second antenna after the delay; and transmitting a sounding reference signal symbol on the second antenna.

In a number of embodiments, the sequence of symbols includes the sounding reference signal.

In several embodiments, the single command initiates sounding reference signal switching.

In various embodiments, the antenna switch is open for a portion of the antenna switch actuation.

In some embodiments, the antenna switch makes connection with the second antenna before breaking a connection with the first antenna during the antenna switch actuation.

In certain embodiments, the present disclosure relates to a mobile device. The mobile device includes a baseband system configured to generate a sequence of symbols for transmission to a first antenna and a single command to initiate sounding reference signal switching; and a front end module including a power amplifier and a switch configured to switch between the first antenna and a second antenna, the power amplifier module configured to, in response to receiving the single command, reduce gain of the power amplifier, initiate a delay, after the delay, switch the switch from the first antenna to the second antenna, and transmit a sounding reference signal symbol on the second antenna.

In a number of embodiments, the single command is received at a mobile industry processor interface within the front end module.

In several embodiments, the switch actuation occurs during a cycle prefix associated with the sounding reference signal symbol.

In some embodiments, receipt of the single command initiates a sequence stored in a register internal to the front end module.

In various embodiments, the front end module further includes a power amplifier module that includes the power amplifier and a first controller, the front end module further including a switch module that includes the switch and a second controller.

In a number of embodiments, the first controller is configured to reduce the gain of the power amplifier in response to receiving the single command.

In several embodiments, the second controller is configured to initiate the delay and switch the switch in response to receiving the single command.

In various embodiments, the front end module further includes a controller that is configured to receive the command and initiate an ordered set of actions in response to receiving the command.

In some embodiments, transmission of the sounding reference signal symbol occurs without transmitting a blank symbol before and after the sounding reference signal symbol.

In a number of embodiments, the switching of the switch occurs during a cycle prefix associated with the sounding reference signal symbol.

In various embodiments, the baseband system notifies a base station in a communication network that the sounding reference signal symbols are transmitted without preceding and following blank symbols.

In certain embodiments, the present disclosure relates to a front end system. The front end system includes a power amplifier configured to provide an amplified radio frequency signal at a switch input for transmission to a first antenna terminal; an antenna switch configured to receive the amplified radio frequency signal at the switch input and switch between the first antenna terminal and a second antenna terminal; and a controller configured to receive a trigger word and, in response to the trigger word, reduce gain of the power amplifier, initiate a delay, and cause, after the delay, actuation of the antenna switch, the switch input of the actuated switch in communication with the second antenna terminal, the controller further configured to cause transmission of a sounding reference signal symbol to the second antenna terminal.

In various embodiments, reducing the gain of the power amplifier includes lowering a bias of the power amplifier.

In a number of embodiments, lowering the bias of the power amplifier includes lowering the bias of one or more amplifying stages of the power amplifier.

In some embodiments, the controller includes a sequence register.

In certain embodiments, the present disclosure relates to a method of sounding reference signal switching in a mobile device. The method includes transmitting a sequence of data symbols through a power amplifier and antenna switch to a first antenna; and in response to receiving a single signal that initiates sounding reference signal switching, notifying a base station associated with the mobile device to withhold blanking symbols before and after a sounding reference signal symbol and initiating an ordered list events that cause the antenna switch to actuate for transmission of the sounding reference signal symbol to a second antenna.

In various embodiments, the ordered-list of events includes reducing gain of the power amplifier, initiating a delay, and switching the antenna switch from the first antenna to the second antenna after the delay.

In several embodiments, the order-list of events further includes transmitting the sounding reference signal symbol on the second antenna without blank symbols inserted into the sequence of data symbols for transmission during switching.

In a number of embodiments, reducing the gain of the power amplifier includes lowering a bias of the power amplifier.

In various embodiments, reducing the gain of the power amplifier includes placing the power amplifier in a low power mode.

In some embodiments, the antenna switch actuation occurs between the data symbols of the sequence of data symbols.

In several embodiments, the antenna switch actuation occurs during transmission of a cycle prefix associated with the sounding reference signal symbol.

In certain embodiments, the present disclosure relates to a mobile device. The mobile device includes a baseband system configured to generate a sequence of symbols for transmission over a first antenna, a command for initiating sounding reference signal switching, and a notification to a communication network to withhold blanking symbols before and after the sounding reference signal symbol; and a front end module including an interface, a power amplifier and an antenna switch configured to receive an amplified radio frequency signal from the power amplifier, the controller configured to cause the antenna switch to switch between the first antenna and a second antenna in response to receiving the command, the sounding reference signal symbol transmitted over the second antenna.

In various embodiments, the front end module includes a power amplifier module and a switch module and the interface includes a power amplifier controller and a switch controller.

In a number of embodiments, the power amplifier module includes the power amplifier and the power amplifier controller, wherein the power amplifier controller is configured to control gain of the power amplifier.

In various embodiments, the switch module include the antenna switch and the switch controller, wherein the switch controller is configured to control timing of the switching of the antenna switch.

In various embodiments, the interface is a mobile industry processor interface.

In a number of embodiments, the antenna switch makes connection with the second antenna before breaking a connection with the first antenna during the antenna switch actuation.

In some embodiments, the controller is further configured to reduce gain of the power amplifier before causing the antenna switch to switch.

In various embodiments, reducing the gain of the power amplifier includes placing the power amplifier in an off mode.

In several embodiments, reducing the gain of the power amplifier includes shunting one or more amplifying stages of the power amplifier.

In certain embodiments, the present disclosure relates to a communication system. The communication system includes a base station configured to initiate sounding reference signal switching; and a mobile device including a power amplifier and an antenna switch configured to provide an amplified radio frequency signal from the power amplifier to a first antenna and switch from the first antenna to a second antenna for transmission of a sounding reference signal symbol, a controller configured to receive a trigger command in response to the initiated sounding reference signal switching and cause the antenna switch to perform antenna swapping to transmit the sounding reference symbol signal over the second antenna, and a processor configured to notify the base station to withhold blanking symbols before and after the sounding reference signal symbol.

In various embodiments, the antenna swapping is performed during transmission of a cycle-prefix of the sounding reference signal symbol.

In some embodiments, the controller initiates a self-sequenced mode responsive to receipt of the trigger command.

In a number of embodiments, the self-sequenced mode includes commands to cause reduction in gain of the power amplifier, initiation of a delay, and antenna swapping after the delay.

BRIEF DESCRIPTION OF THE DRAWINGS

FIG. 9A is a schematic diagram of one example of a communication system operating with SRS for one transmit two receive (1T2R) exhibiting slow antenna switching.

FIG. 9B is a schematic diagram of one example of a communication system operating with SRS for one transmit two receive (1T2R) exhibiting fast antenna switching.

DETAILED DESCRIPTION OF EMBODIMENTS

Figure 1:
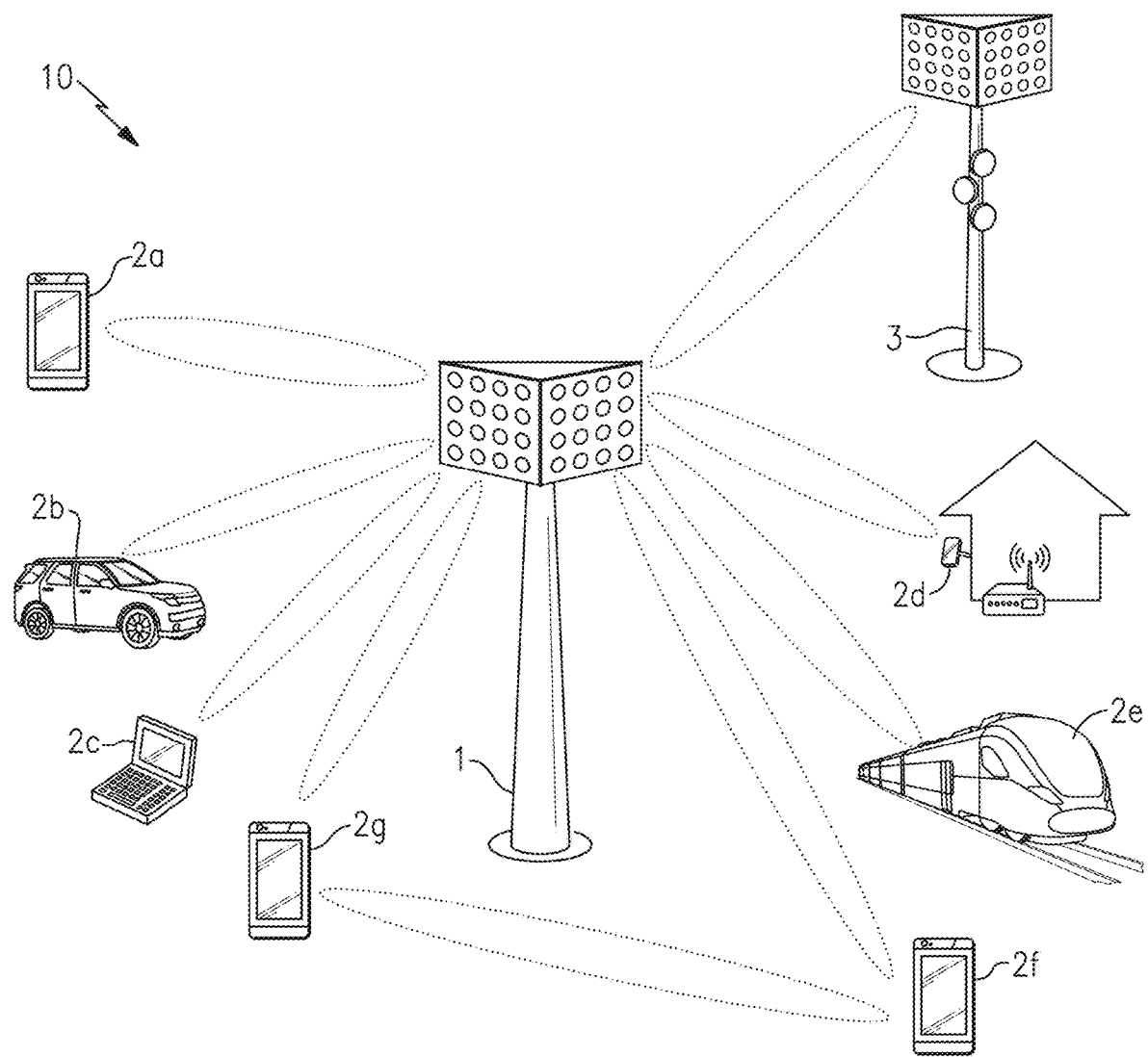
FIG. 1 is a schematic diagram of one example of a communication network.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The International Telecommunication Union (ITU) is a specialized agency of the United Nations (UN) responsible for global issues concerning information and communication technologies, including the shared global use of radio spectrum.

The 3rd Generation Partnership Project (3GPP) is a collaboration between groups of telecommunications standard bodies across the world, such as the Association of Radio Industries and Businesses (ARIB), the Telecommunications Technology Committee (TTC), the China Communications Standards Association (CCSA), the Alliance for Telecommunications Industry Solutions (ATIS), the Telecommunications Technology Association (TTA), the European Telecommunications Standards Institute (ETSI), and the Telecommunications Standards Development Society, India (TSDSI).

Working within the scope of the ITU, 3GPP develops and maintains technical specifications for a variety of mobile communication technologies, including, for example, second generation (2G) technology (for instance, Global System for Mobile Communications (GSM) and Enhanced Data Rates for GSM Evolution (EDGE)), third generation (3G) technology (for instance, Universal Mobile Telecommunications System (UMTS) and High Speed Packet Access (HSPA)), and fourth generation (4G) technology (for instance, Long Term Evolution (LTE) and LTE-Advanced).

The technical specifications controlled by 3GPP can be expanded and revised by specification releases, which can span multiple years and specify a breadth of new features and evolutions.

In one example, 3GPP introduced carrier aggregation (CA) for LTE in Release 10. Although initially introduced with two downlink carriers, 3GPP expanded carrier aggregation in Release 14 to include up to five downlink carriers and up to three uplink carriers. Other examples of new features and evolutions provided by 3GPP releases include, but are not limited to, New Radio Unlicensed (NR-U), License Assisted Access (LAA), enhanced LAA (eLAA), Narrowband Internet of things (NB-IOT), Vehicle-to-Everything (V2X), and High Power User Equipment (HPUE).

3GPP introduced Phase 1 of fifth generation (5G) technology in Release 15, and Phase 2 of 5G technology in Release 16. Subsequent 3GPP releases will further evolve and expand 5G technology. 5G technology is also referred to herein as 5G New Radio (NR).

5G NR supports or plans to support a variety of features, such as communications over millimeter wave spectrum, beamforming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

The teachings herein are applicable to a wide variety of communication systems, including, but not limited to, communication systems using advanced cellular technologies, such as LTE-Advanced, LTE-Advanced Pro, and/or 5G NR.

FIG. 1 is a schematic diagram of one example of a communication network 10. The communication network 10 includes a macro cell base station 1, a small cell base station 3, and various examples of user equipment (UE), including a first mobile device 2a, a wireless-connected car 2b, a laptop 2c, a stationary wireless device 2d, a wireless-connected train 2e, a second mobile device 2f, and a third mobile device 2g.

Although specific examples of base stations and user equipment are illustrated in FIG. 1, a communication network can include base stations and user equipment of a wide variety of types and/or numbers.

For instance, in the example shown, the communication network 10 includes the macro cell base station 1 and the small cell base station 3. The small cell base station 3 can operate with relatively lower power, shorter range, and/or with fewer concurrent users relative to the macro cell base station 1. The small cell base station 3 can also be referred to as a femtocell, a picocell, or a microcell. Although the communication network 10 is illustrated as including two base stations, the communication network 10 can be implemented to include more or fewer base stations and/or base stations of other types.

Although various examples of user equipment are shown, the teachings herein are applicable to a wide variety of user equipment, including, but not limited to, mobile phones, tablets, laptops, IoT devices, wearable electronics, customer premises equipment (CPE), wireless-connected vehicles, wireless relays, and/or a wide variety of other communication devices. Furthermore, user equipment includes not only currently available communication devices that operate in a cellular network, but also subsequently developed communication devices that will be readily implementable with the inventive systems, processes, methods, and devices as described and claimed herein.

The illustrated communication network 10 of FIG. 1 supports communications using a variety of cellular technologies, including, for example, 4G LTE and 5G NR. In certain implementations, the communication network 10 is further adapted to provide a wireless local area network (WLAN), such as WiFi. Although various examples of communication technologies have been provided, the communication network 10 can be adapted to support a wide variety of communication technologies.

Various communication links of the communication network 10 have been depicted in FIG. 1. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

In certain implementations, user equipment can communicate with a base station using one or more of 4G LTE, 5G NR, and WiFi technologies. In certain implementations, technologies such as enhanced license assisted access (eLAA) or New Radio Unlicensed (NR-U) are used to aggregate one or more licensed frequency carriers (for instance, licensed 4G LTE and/or 5G NR frequencies), with one or more unlicensed carriers (for instance, unlicensed WiFi frequencies).

As shown in FIG. 1, the communication links include not only communication links between UE and base stations, but also UE to UE communications and base station to base station communications. For example, the communication network 10 can be implemented to support self-fronthaul and/or self-backhaul.

The communication links can operate over a wide variety of frequencies. In certain implementations, communications are supported using 5G NR technology over one or more frequency bands that are less than 6 Gigahertz (GHz) and/or over one or more frequency bands that are greater than 6 GHz. For example, the communication links can serve Frequency Range 1 (FR1), Frequency Range 2 (FR2), or a combination thereof. In one embodiment, one or more of the mobile devices support a HPUE power class specification.

In certain implementations, a base station and/or user equipment communicates using beamforming. For example, beamforming can be used to focus signal strength to overcome path losses, such as high loss associated with communicating over high signal frequencies. In certain embodiments, user equipment, such as one or more mobile phones, communicate using beamforming on millimeter wave frequency bands in the range of 30 GHz to 300 GHz and/or upper centimeter wave frequencies in the range of 6 GHz to 30 GHz, or more particularly, 24 GHz to 30 GHz.

Different users of the communication network 10 can share available network resources, such as available frequency spectrum, in a wide variety of ways.

In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDMA is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Enhanced mobile broadband (eMBB) refers to technology for growing system capacity of LTE networks. For example, eMBB can refer to communications with a peak data rate of at least 10 Gbps and a minimum of 100 Mbps for each user. Ultra-reliable low latency communications (uRLLC) refers to technology for communication with very low latency, for instance, less than 2 milliseconds. uRLLC can be used for mission-critical communications such as for autonomous driving and/or remote surgery applications. Massive machine-type communications (mMTC) refers to low cost and low data rate communications associated with wireless connections to everyday objects, such as those associated with Internet of Things (IoT) applications.

The communication network 10 of FIG. 1 can be used to support a wide variety of advanced communication features, including, but not limited to, eMBB, uRLLC, and/or mMTC.

Figure 2A:
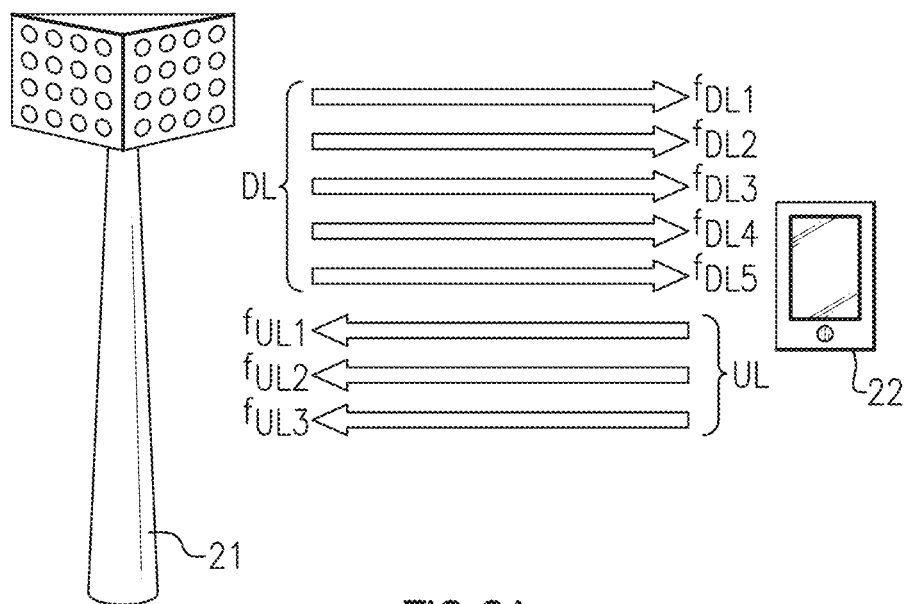
FIG. 2A is a schematic diagram of one example of a communication link using carrier aggregation.

FIG. 2A is a schematic diagram of one example of a communication link using carrier aggregation. Carrier aggregation can be used to widen bandwidth of the communication link by supporting communications over multiple frequency carriers, thereby increasing user data rates and enhancing network capacity by utilizing fragmented spectrum allocations.

In the illustrated example, the communication link is provided between a base station 21 and a mobile device 22. As shown in FIG. 2A, the communications link includes a downlink channel used for RF communications from the base station 21 to the mobile device 22, and an uplink channel used for RF communications from the mobile device 22 to the base station 21.

Although FIG. 2A illustrates carrier aggregation in the context of FDD communications, carrier aggregation can also be used for TDD communications.

In certain implementations, a communication link can provide asymmetrical data rates for a downlink channel and an uplink channel. For example, a communication link can be used to support a relatively high downlink data rate to enable high speed streaming of multimedia content to a mobile device, while providing a relatively slower data rate for uploading data from the mobile device to the cloud.

In the illustrated example, the base station 21 and the mobile device 22 communicate via carrier aggregation, which can be used to selectively increase bandwidth of the communication link. Carrier aggregation includes contiguous aggregation, in which contiguous carriers within the same operating frequency band are aggregated. Carrier aggregation can also be non-contiguous, and can include carriers separated in frequency within a common band or in different bands.

In the example shown in FIG. 2A, the uplink channel includes three aggregated component carriers $f_{UL1}$, $f_{UL2}$, and $f_{UL3}$. Additionally, the downlink channel includes five aggregated component carriers $f_{DL1}$, $f_{DL2}$, $f_{DL3}$, $f_{DL4}$, and $f_{DL5}$. Although one example of component carrier aggregation is shown, more or fewer carriers can be aggregated for uplink and/or downlink. Moreover, a number of aggregated carriers can be varied over time to achieve desired uplink and downlink data rates.

For example, a number of aggregated carriers for uplink and/or downlink communications with respect to a particular mobile device can change over time. For example, the number of aggregated carriers can change as the device moves through the communication network and/or as network usage changes over time.

Figure 2B:
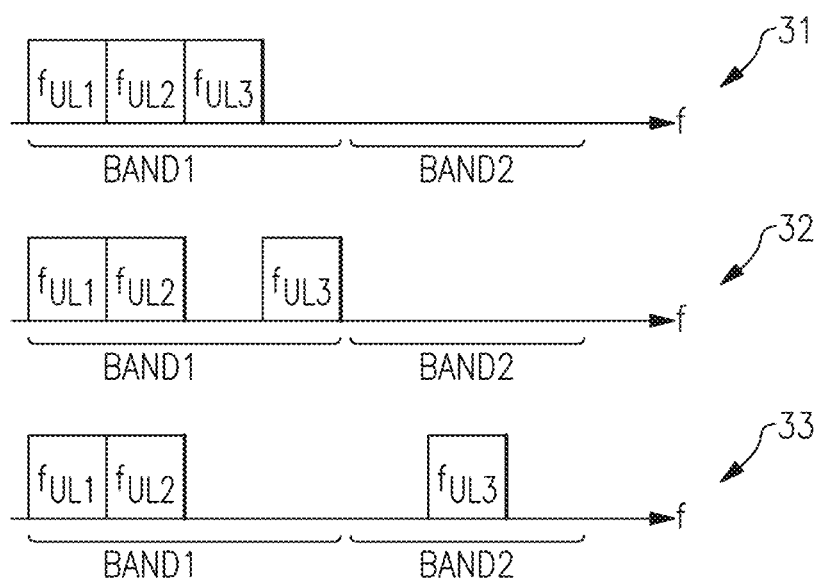
FIG. 2B illustrates various examples of uplink carrier aggregation for the communication link of FIG. 2A.

FIG. 2B illustrates various examples of uplink carrier aggregation for the communication link of FIG. 2A. FIG. 2B includes a first carrier aggregation scenario 31, a second carrier aggregation scenario 32, and a third carrier aggregation scenario 33, which schematically depict three types of carrier aggregation.

The carrier aggregation scenarios 31-33 illustrate different spectrum allocations for a first component carrier $f_{UL1}$, a second component carrier $f_{UL2}$, and a third component carrier $f_{UL3}$. Although FIG. 2B is illustrated in the context of aggregating three component carriers, carrier aggregation can be used to aggregate more or fewer carriers. Moreover, although illustrated in the context of uplink, the aggregation scenarios are also applicable to downlink.

The first carrier aggregation scenario 31 illustrates intra-band contiguous carrier aggregation, in which component carriers that are adjacent in frequency and in a common frequency band are aggregated. For example, the first carrier aggregation scenario 31 depicts aggregation of component carriers $f_{UL1}$, $f_{UL2}$, and $f_{UL3}$ that are contiguous and located within a first frequency band BAND1.

With continuing reference to FIG. 2B, the second carrier aggregation scenario 32 illustrates intra-band non-continuous carrier aggregation, in which two or more components carriers that are non-adjacent in frequency and within a common frequency band are aggregated. For example, the second carrier aggregation scenario 32 depicts aggregation of component carriers $f_{UL1}$, $f_{UL2}$, and $f_{UL3}$ that are non-contiguous, but located within a first frequency band BAND1.

The third carrier aggregation scenario 33 illustrates interband non-contiguous carrier aggregation, in which component carriers that are non-adjacent in frequency and in multiple frequency bands are aggregated. For example, the third carrier aggregation scenario 33 depicts aggregation of component carriers $f_{UL1}$ and $f_{UL2}$ of a first frequency band BAND1 with component carrier $f_{UL3}$ of a second frequency band BAND2.

Figure 2C:
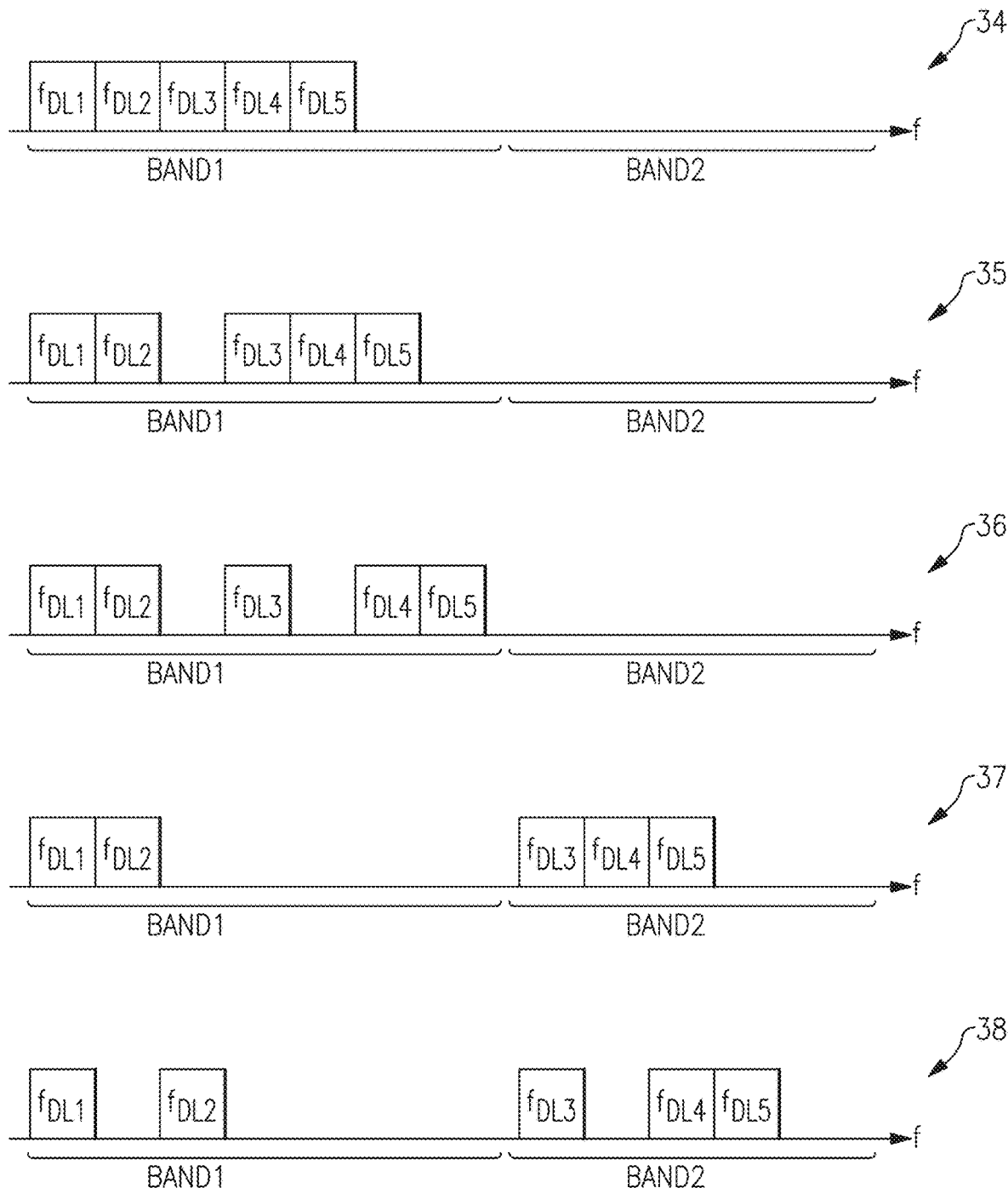
FIG. 2C illustrates various examples of downlink carrier aggregation for the communication link of FIG. 2A.

FIG. 2C illustrates various examples of downlink carrier aggregation for the communication link of FIG. 2A. The examples depict various carrier aggregation scenarios 34-38 for different spectrum allocations of a first component carrier $f_{DL1}$, a second component carrier $f_{DL2}$, a third component carrier $f_{DL3}$, a fourth component carrier $f_{DL4}$, and a fifth component carrier $f_{DL5}$. Although FIG. 2C is illustrated in the context of aggregating five component carriers, carrier aggregation can be used to aggregate more or fewer carriers. Moreover, although illustrated in the context of downlink, the aggregation scenarios are also applicable to uplink.

The first carrier aggregation scenario 34 depicts aggregation of component carriers that are contiguous and located within the same frequency band. Additionally, the second carrier aggregation scenario 35 and the third carrier aggregation scenario 36 illustrates two examples of aggregation that are non-contiguous, but located within the same frequency band. Furthermore, the fourth carrier aggregation scenario 37 and the fifth carrier aggregation scenario 38 illustrates two examples of aggregation in which component carriers that are non-adjacent in frequency and in multiple frequency bands are aggregated. As a number of aggregated component carriers increases, a complexity of possible carrier aggregation scenarios also increases.

With reference to FIGS. 2A-2C, the individual component carriers used in carrier aggregation can be of a variety of frequencies, including, for example, frequency carriers in the same band or in multiple bands. Additionally, carrier aggregation is applicable to implementations in which the individual component carriers are of about the same bandwidth as well as to implementations in which the individual component carriers have different bandwidths.

Certain communication networks allocate a particular user device with a primary component carrier (PCC) or anchor carrier for uplink and a PCC for downlink. Additionally, when the mobile device communicates using a single frequency carrier for uplink or downlink, the user device communicates using the PCC. To enhance bandwidth for uplink communications, the uplink PCC can be aggregated with one or more uplink secondary component carriers (SCCs). Additionally, to enhance bandwidth for downlink communications, the downlink PCC can be aggregated with one or more downlink SCCs.

In certain implementations, a communication network provides a network cell for each component carrier. Additionally, a primary cell can operate using a PCC, while a secondary cell can operate using a SCC. The primary and second cells may have different coverage areas, for instance, due to differences in frequencies of carriers and/or network environment.

New Radio Unlicensed (NR-U) and License assisted access (LAA) can refer to downlink carrier aggregation in which a licensed frequency carrier associated with a mobile operator is aggregated with a frequency carrier in unlicensed spectrum, such as WiFi. These technologies can employ a downlink PCC in the licensed spectrum that carries control and signaling information associated with the communication link, while unlicensed spectrum is aggregated for wider downlink bandwidth when available. Such technologies can operate with dynamic adjustment of secondary carriers to avoid WiFi users and/or to coexist with WiFi users. Versions of these technologies (e.g., license assisted access [eLAA]) can refer to an evolution of LAA that aggregates licensed and unlicensed spectrum for both downlink and uplink.

Figure 3A:
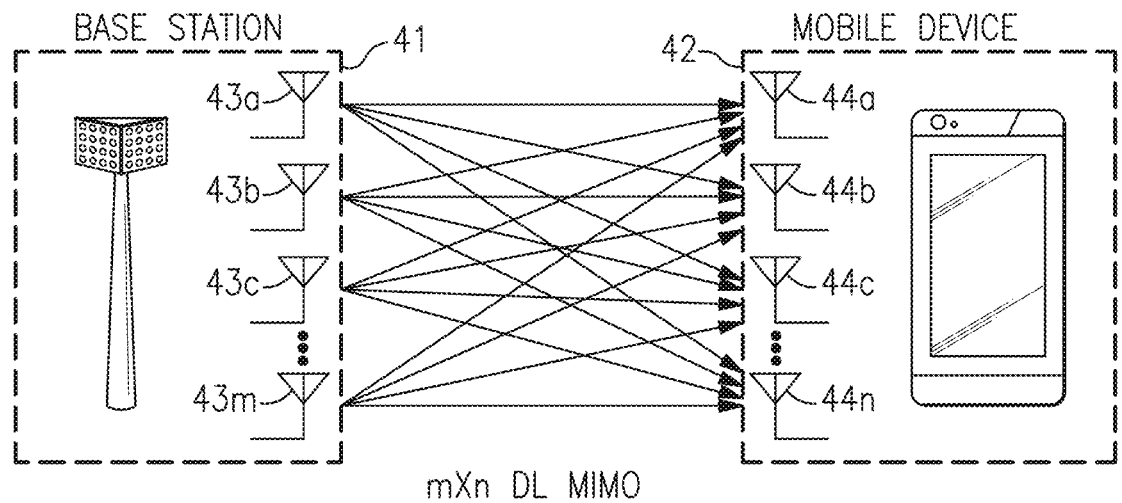
FIG. 3A is a schematic diagram of one example of a downlink channel using multi-input and multi-output (MIMO) communications.
Figure 3B:
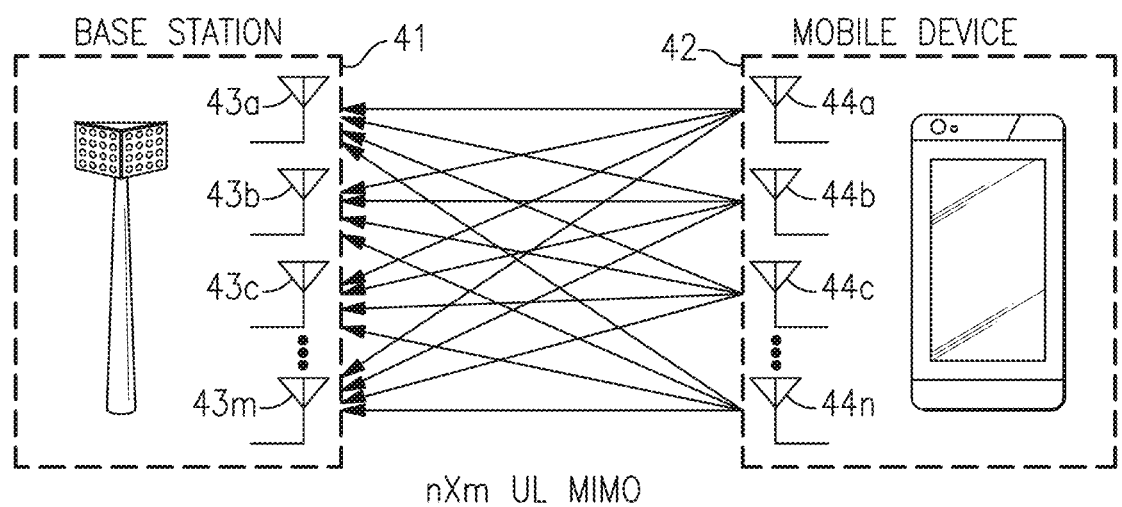
FIG. 3B is schematic diagram of one example of an uplink channel using MIMO communications.

FIG. 3A is a schematic diagram of one example of a downlink channel using multi-input and multi-output (MIMO) communications. FIG. 3B is schematic diagram of one example of an uplink channel using MIMO communications.

MIMO communications use multiple antennas for simultaneously communicating multiple data streams over common frequency spectrum. In certain implementations, the data streams operate with different reference signals to enhance data reception at the receiver. MIMO communications benefit from higher SNR, improved coding, and/or reduced signal interference due to spatial multiplexing differences of the radio environment.

MIMO order refers to a number of separate data streams sent or received. For instance, MIMO order for downlink communications can be described by a number of transmit antennas of a base station and a number of receive antennas for UE, such as a mobile device. For example, two-by-two (2×2) DL MIMO refers to MIMO downlink communications using two base station antennas and two UE antennas. Additionally, four-by-four (4×4) DL MIMO refers to MIMO downlink communications using four base station antennas and four UE antennas.

In the example shown in FIG. 3A, downlink MIMO communications are provided by transmitting using M antennas 43a, 43b, 43c, . . . 43m of the base station 41 and receiving using N antennas 44a, 44b, 44c, . . . 44n of the mobile device 42. Accordingly, FIG. 3A illustrates an example of m×n DL MIMO.

Likewise, MIMO order for uplink communications can be described by a number of transmit antennas of UE, such as a mobile device, and a number of receive antennas of a base station. For example, 2×2 UL MIMO refers to MIMO uplink communications using two UE antennas and two base station antennas. Additionally, 4×4 UL MIMO refers to MIMO uplink communications using four UE antennas and four base station antennas.

In the example shown in FIG. 3B, uplink MIMO communications are provided by transmitting using N antennas 44a, 44b, 44c, . . . 44n of the mobile device 42 and receiving using M antennas 43a, 43b, 43c, . . . 43m of the base station 41. Accordingly, FIG. 3B illustrates an example of n×m UL MIMO.

By increasing the level or order of MIMO, bandwidth of an uplink channel and/or a downlink channel can be increased.

MIMO communications are applicable to communication links of a variety of types, such as FDD communication links and TDD communication links.

Figure 3C:
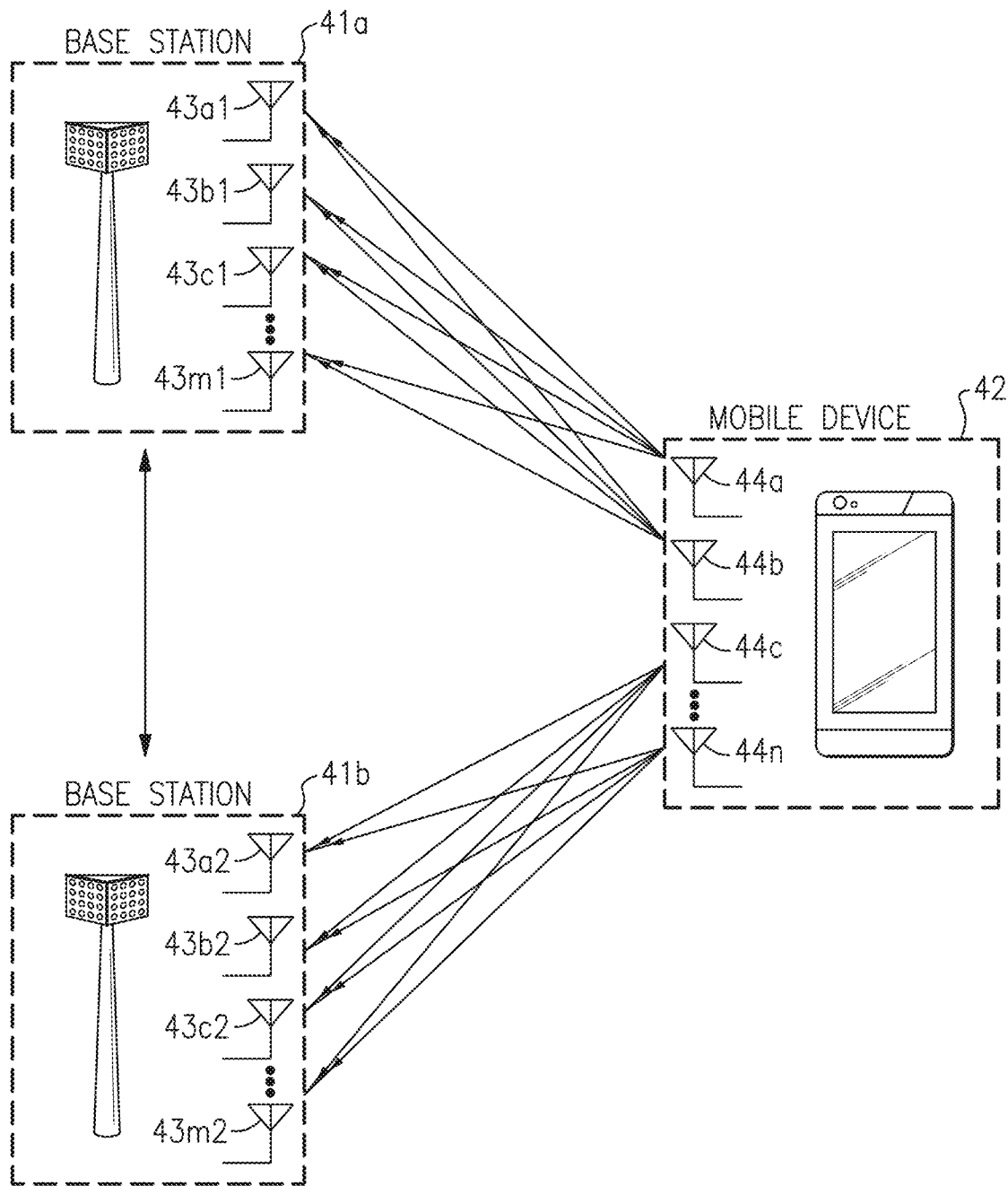
FIG. 3C is schematic diagram of another example of an uplink channel using MIMO communications.

FIG. 3C is schematic diagram of another example of an uplink channel using MIMO communications. In the example shown in FIG. 3C, uplink MIMO communications are provided by transmitting using N antennas 44a, 44b, 44c, . . . 44n of the mobile device 42. Additional a first portion of the uplink transmissions are received using M antennas 43a1, 43b1, 43c1, 43m1 of a first base station 41a, while a second portion of the uplink transmissions are received using M antennas 43a2, 43b2, 43c2, 43m2 of a second base station 41b. Additionally, the first base station 41a and the second base station 41b communication with one another over wired, optical, and/or wireless links.

The MIMO scenario of FIG. 3C illustrates an example in which multiple base stations cooperate to facilitate MIMO communications.

Figure 4:
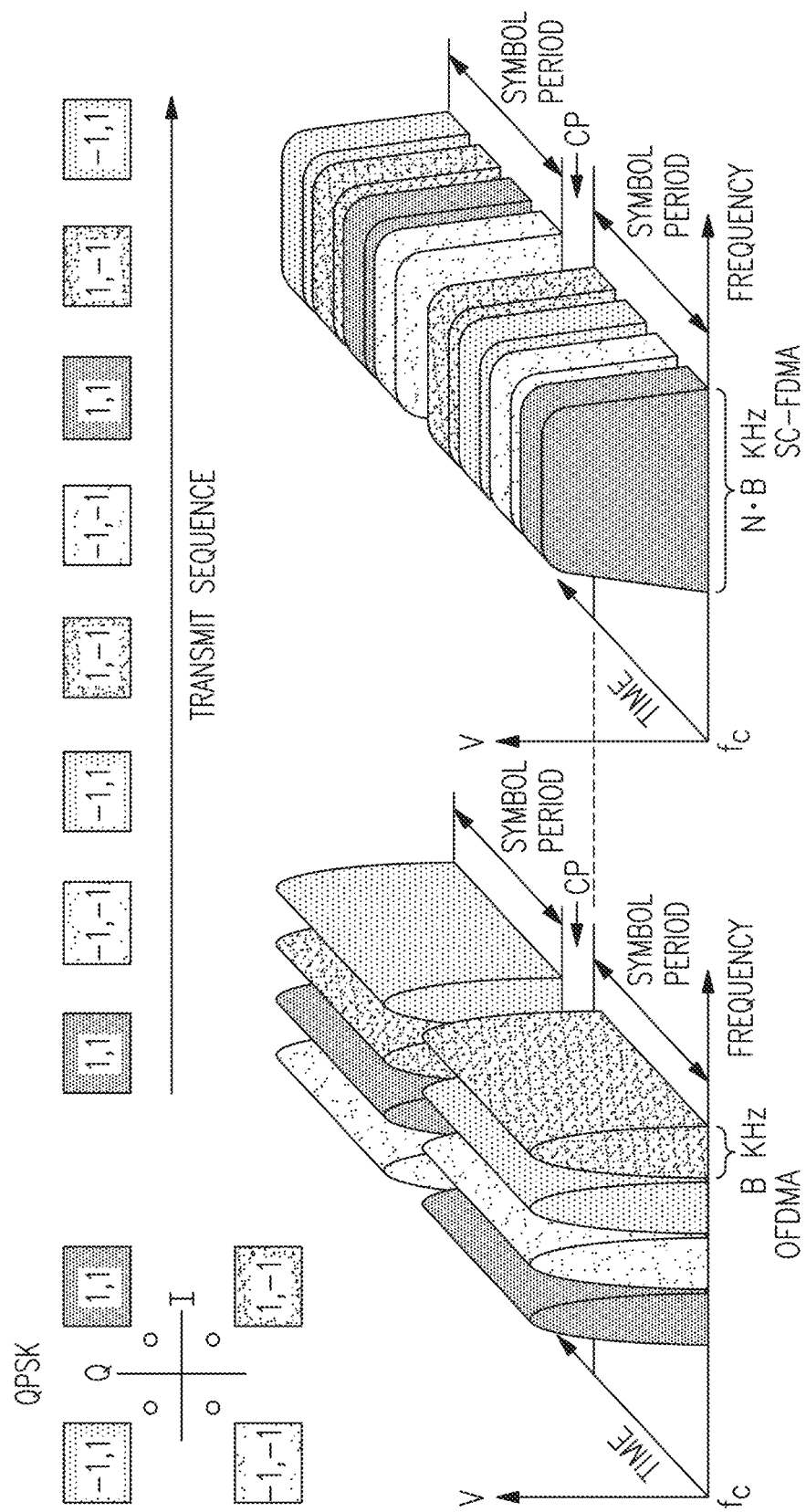
FIG. 4 is a schematic diagram illustrating two examples of multiple access schemes for a communication network.

FIG. 4 is a schematic diagram illustrating two examples of multiple access schemes for a communication network. Examples of frequency versus voltage versus time for OFDMA and SC-FDMA are depicted in FIG. 4.

The examples are shown for an illustrated transmit sequence of different QPSK modulating data symbols, in this embodiment. As shown in FIG. 4, SC-FDMA includes data symbols occupying greater bandwidth (N*B KHz, where N=4 in this example) relative to OFDMA data symbols (B KHz). However, the SC-FDMA data symbols occupy the greater bandwidth for a fraction of time (1/N) relative to that of the OFDMA data symbols. FIG. 4 has also been annotated to show times of transmitting a cyclic prefix (CP).

Figure 5A:
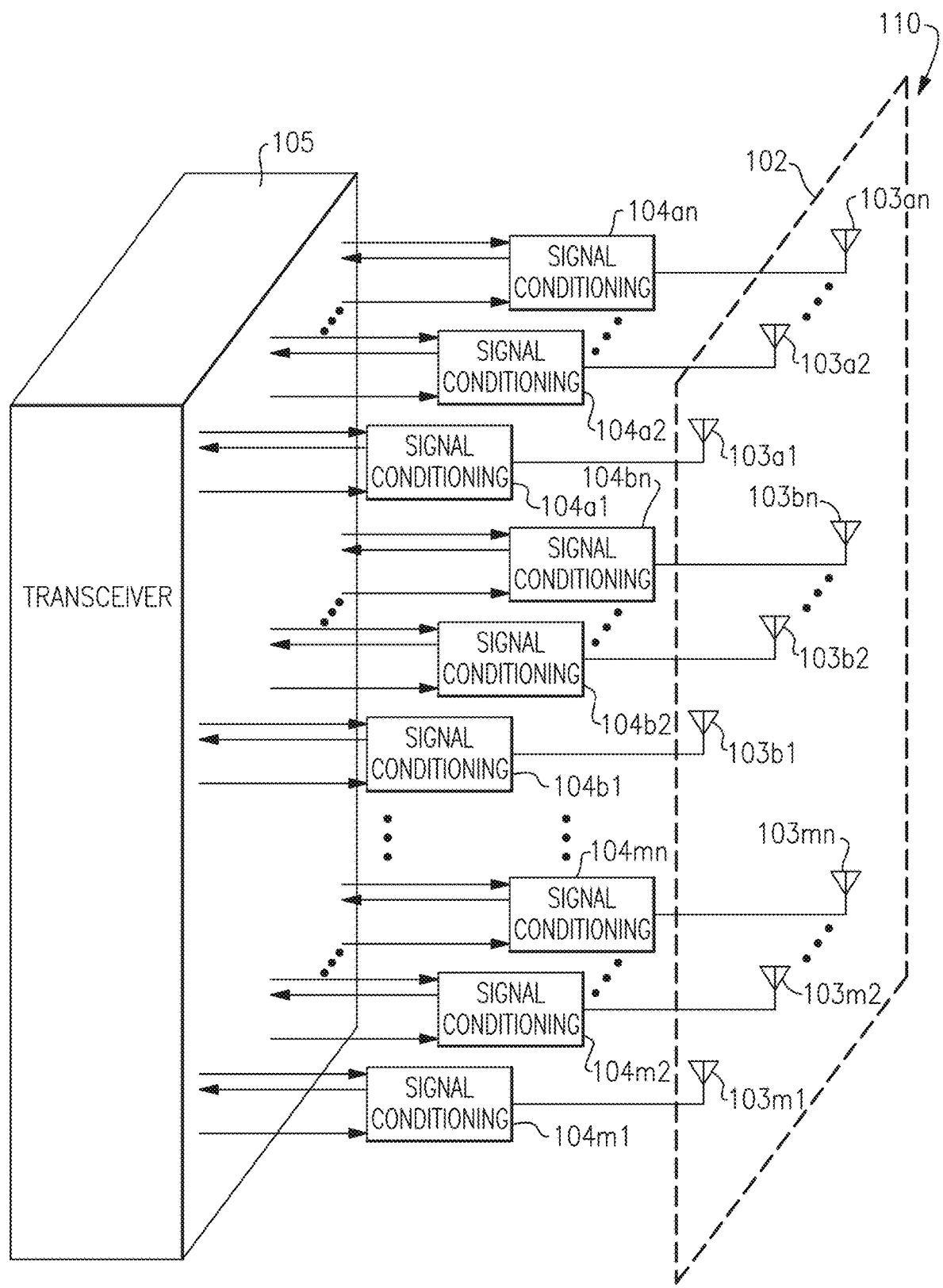
FIG. 5A is a schematic diagram of one example of a communication system that operates with beamforming.

FIG. 5A is a schematic diagram of one example of a communication system 110 that operates with beamforming. The communication system 110 includes a transceiver 105, signal conditioning circuits 104a1, 104a2 ... 104an, 104b1, 104b2 ... 104bn, 104m1, 104m2 ... 104mn, and an antenna array 102 that includes antenna elements 103a1, 103a2 ... 103an, 103b1, 103b2 ... 103bn, 103m1, 103m2 ... 103mn.

Communications systems that communicate using millimeter wave carriers (for instance, 30 GHz to 300 GHz), centimeter wave carriers (for instance, 3 GHz to 30 GHz), and/or other frequency carriers can employ an antenna array to provide beam formation and directivity for transmission and/or reception of signals.

For example, in the illustrated embodiment, the communication system 110 includes an array 102 of m×n antenna elements, which are each controlled by a separate signal conditioning circuit, in this embodiment. As indicated by the ellipses, the communication system 110 can be implemented with any suitable number of antenna elements and signal conditioning circuits.

With respect to signal transmission, the signal conditioning circuits can provide transmit signals to the antenna array 102 such that signals radiated from the antenna elements combine using constructive and destructive interference to generate an aggregate transmit signal exhibiting beam-like qualities with more signal strength propagating in a given direction away from the antenna array 102.

In the context of signal reception, the signal conditioning circuits process the received signals (for instance, by separately controlling received signal phases) such that more signal energy is received when the signal is arriving at the antenna array 102 from a particular direction. Accordingly, the communication system 110 also provides directivity for reception of signals.

The relative concentration of signal energy into a transmit beam or a receive beam can be enhanced by increasing the size of the array. For example, with more signal energy focused into a transmit beam, the signal is able to propagate for a longer range while providing sufficient signal level for RF communications. For instance, a signal with a large proportion of signal energy focused into the transmit beam can exhibit high effective isotropic radiated power (EIRP).

In the illustrated embodiment, the transceiver 105 provides transmit signals to the signal conditioning circuits and processes signals received from the signal conditioning circuits. As shown in FIG. 5A, the transceiver 105 generates control signals for the signal conditioning circuits. The control signals can be used for a variety of functions, such as controlling the gain and phase of transmitted and/or received signals to control beamforming.

Figure 5B:
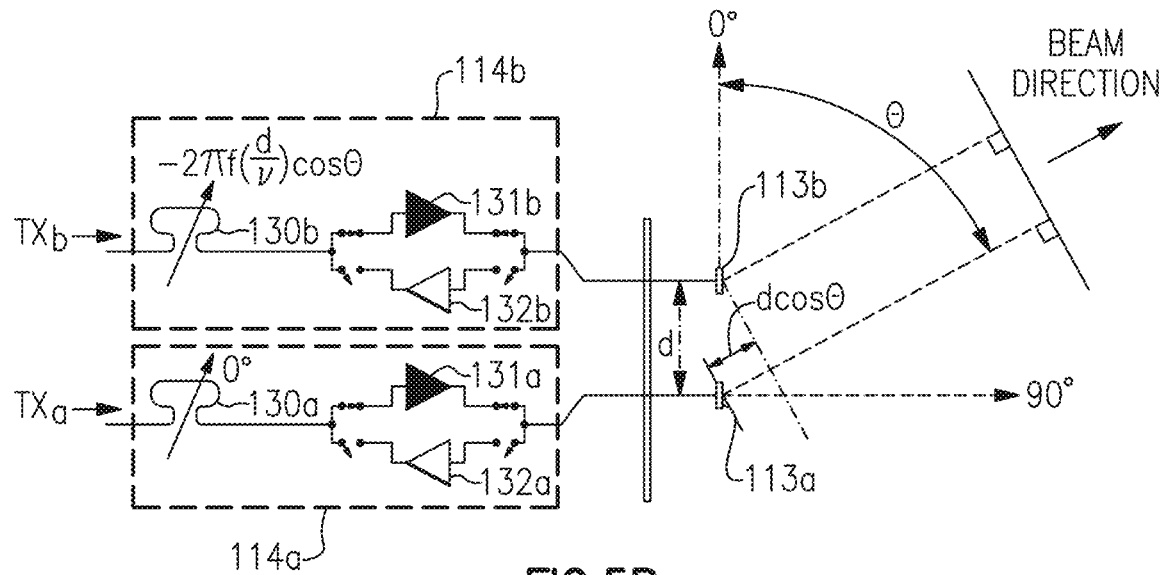
FIG. 5B is a schematic diagram of one example of beamforming to provide a transmit beam.

FIG. 5B is a schematic diagram of one example of beamforming to provide a transmit beam. FIG. 5B illustrates a portion of a communication system including a first signal conditioning circuit 114a, a second signal conditioning circuit 114b, a first antenna element 113a, and a second antenna element 113b.

Although illustrated as included two antenna elements and two signal conditioning circuits, a communication system can include additional antenna elements and/or signal conditioning circuits. For example, FIG. 5B illustrates one embodiment of a portion of the communication system 110 of FIG. 5A.

The first signal conditioning circuit 114a includes a first phase shifter 130a, a first power amplifier 131a, a first low noise amplifier (LNA) 132a, and switches for controlling selection of the power amplifier 131a or LNA 132a. Additionally, the second signal conditioning circuit 114b includes a second phase shifter 130b, a second power amplifier 131b, a second LNA 132b, and switches for controlling selection of the power amplifier 131b or LNA 132b.

Although one embodiment of signal conditioning circuits is shown, other implementations of signal conditioning circuits are possible. For instance, in one example, a signal conditioning circuit includes one or more band filters, duplexers, and/or other components.

In the illustrated embodiment, the first antenna element 113a and the second antenna element 113b are separated by a distance d. Additionally, FIG. 5B has been annotated with an angle Θ, which in this example has a value of about 90° when the transmit beam direction is substantially perpendicular to a plane of the antenna array and a value of about 0° when the transmit beam direction is substantially parallel to the plane of the antenna array.

By controlling the relative phase of the transmit signals provided to the antenna elements 113a, 113b, a desired transmit beam angle Θ can be achieved. For example, when the first phase shifter 130a has a reference value of 0°, the second phase shifter 130b can be controlled to provide a phase shift of about $-2\pi f(d/v)\cos \Theta$ radians, where f is the fundamental frequency of the transmit signal, d is the distance between the antenna elements, v is the velocity of the radiated wave, and π is the mathematic constant pi.

In certain implementations, the distance d is implemented to be about ½λ, where λ is the wavelength of the fundamental component of the transmit signal. In such implementations, the second phase shifter 130b can be controlled to provide a phase shift of about $-\pi \cos \Theta$ radians to achieve a transmit beam angle Θ.

Accordingly, the relative phase of the phase shifters 130a, 130b can be controlled to provide transmit beamforming. In certain implementations, a baseband processor and/or a transceiver (for example, the transceiver 105 of FIG. 5A) controls phase values of one or more phase shifters and gain values of one or more controllable amplifiers to control beamforming.

Figure 5C:
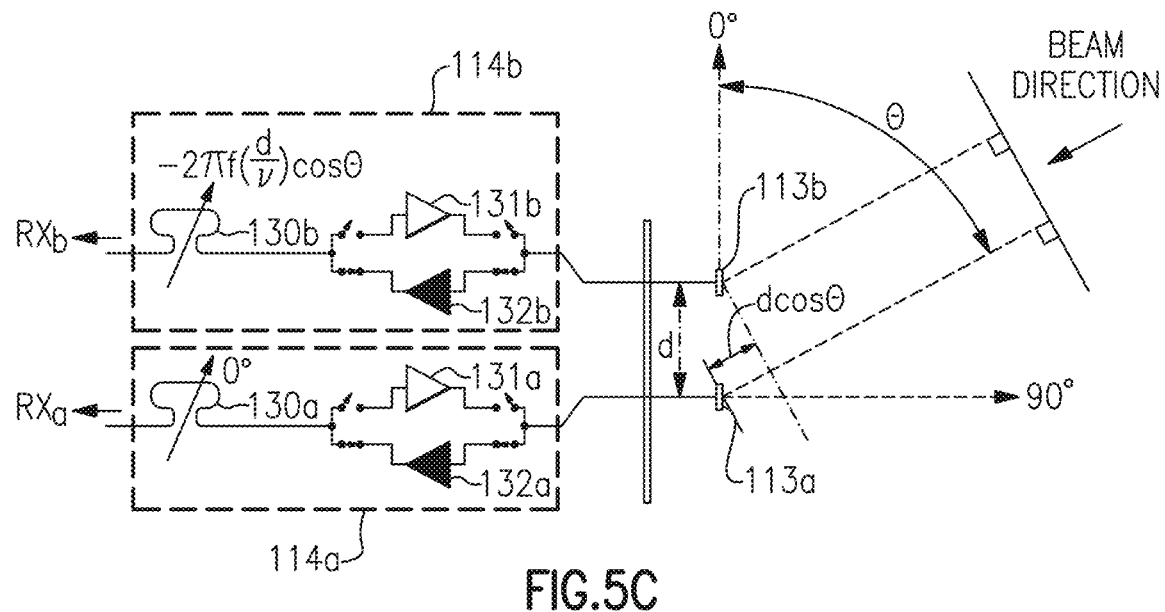
FIG. 5C is a schematic diagram of one example of beamforming to provide a receive beam.

FIG. 5C is a schematic diagram of one example of beamforming to provide a receive beam. FIG. 5C is similar to FIG. 5B, except that FIG. 5C illustrates beamforming in the context of a receive beam rather than a transmit beam.

As shown in FIG. 5C, a relative phase difference between the first phase shifter 130a and the second phase shifter 130b can be selected to about equal to $-2\pi f(d/v)\cos\Theta$ radians to achieve a desired receive beam angle $\Theta$. In implementations in which the distance d corresponds to about $\frac{1}{2}\lambda$, the phase difference can be selected to about equal to $-\pi\cos\Theta$ radians to achieve a receive beam angle $\Theta$.

Although various equations for phase values to provide beamforming have been provided, other phase selection values are possible, such as phase values selected based on implementation of an antenna array, implementation of signal conditioning circuits, and/or a radio environment.

Sounding Reference Signal Switching

In cellular networks, such as 5G networks, sounding reference signal (SRS) features can be enabled to determine channel qualities of a communication link between UE (for example, a wireless device such as a mobile phone) and a base station. SRS symbols are transmitted on uplink and processed by the network to estimate the quality of the wireless channel at different frequencies. For instance, the SRS symbols transmitted by the UE can be used by the base station to estimate the quality of the uplink channel for large bandwidths outside the assigned frequency span to the UE.

Although SRS provides a number of benefits, SRS also places a burden on data transport capacity.

For example, for 3GPP 5G Release 15, ON to ON timing for consecutive SRS symbols is 15 microseconds (μs) for Frequency Range 1 (FR1). For a subcarrier spacing (SCS) of 15 kilohertz (kHz), the cyclic prefix (CP) and 10 μs of the preceding data symbol is consumed. At 30 kHz and 60 kHz SCS 15 μs the ON to ON timing constraint corresponds to about half a symbol and a full symbol, respectively. Thus, a full symbol can be lost or blanked when 30 kHz or 60 kHz SCS is enabled.

Apparatus and methods for SRS switching are provided. In certain embodiments, UE control signals are used to reduce or eliminate the impairment of SRS upon transport capacity. Furthermore, the transmit path resources can be used for other purposes. The teachings herein can be used to utilize fast SRS switching to eliminating the impact of switching timing constraints for SRS symbols on transport capacity.

In certain implementations, the UE switches from a first antenna that is transmitting the RF signal to a second antenna that transmits the SRS symbol and switches from the second antenna to the first antenna to resume transmitting the RF signal.

In certain implementations, the UE includes a first transmit path associated with a first antenna, and a second transmit path associated with a second antenna. The UE switches from the first antenna that is transmitting the RF signal on the first transmit path to the second antenna that transmits the SRS symbol on the second transmit path without transmitting blanking symbols or losing data on the first transmit path during the antenna switch. Further, the UE switches from the second antenna that transmitted the SRS symbol on the second transmit path to the first antenna to resume transmitting the RF signal on the first transmit path without transmitting blanking symbols or losing data on the first transmit path during the antenna switch. By implementing control signals and circuitry to utilize fast antenna switching, SRS can be achieved without overhead on data transport. Implementing SRS in this manner can provide a number of advantages, including, but not limited to, increasing data throughput.

Such low overhead provides a number of advantages. For example, fast SRS switching can be realized to achieve lower latency and enhanced performance relative to an implementation in which time is set aside to permit SRS on a particular antenna by shortening or blanking a symbol.

Figures 6A, 6B:
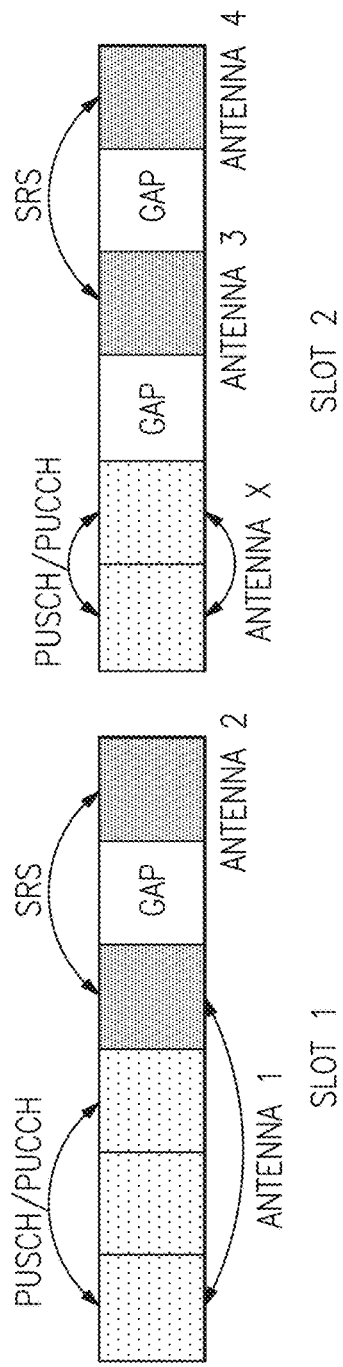
FIG. 6A is a diagram depicting two examples of symbol blanking for time slots including sounding reference signal (SRS) symbols.
FIG. 6B is a table depicting one example of symbol duration versus subcarrier spacing (SCS).

FIG. 6A is a diagram depicting two examples of symbol blanking for time slots including SRS symbols. The depicted transmit sequences show the sequence of transmitted symbols, starting on the left and ending on the right.

Certain cellular networks are implemented with an uplink physical layer that includes multiple physical channels. In one example, a cellular network includes a Physical Uplink Shared Channel (PUSCH) and a Physical Uplink Control Channel (PUCCH). Additionally, the PUSCH is used for transmitting user traffic data, while PUCCH carriers Uplink Control Information (UCI) indicating channel quality and other parameters.

The left-hand side of FIG. 6A depicts an example of a first time slot in which a transmit sequence includes three initial PUSCH/PUCCH symbols transmitted on a first antenna, followed by a first SRS symbol on the first antenna, followed by a blank symbol (GAP), and followed by a second SRS symbol on a second antenna. The right-hand side of FIG. 6A depicts an example of a second time slot in which two PUSCH/PUCCH symbols, a first blank symbol, a first SRS symbol, a second blank symbol, and a second SRS symbol are transmitted using various antennas as indicated.

Table 1 below shows one example of SCS and symbol blanking versus numerology.

TABLE 1

| numerology | SCS [kHz] | Y [symbol] |
|---|---|---|
| 0 | 15 | 1 |
| 1 | 30 | 1 |
| 2 | 60 | 1 |
| 3 | 120 | 2 |

In this example, one symbol blanking is permitted for SCS of 30 kHz and SCS of 60 kHz. Additionally, two symbol blanking is permitted for SCS of 120 kHz.

FIG. 6B is a table depicting one example of symbol duration versus SCS. The table depicts symbol duration for half of a time slot.

Figure 15:
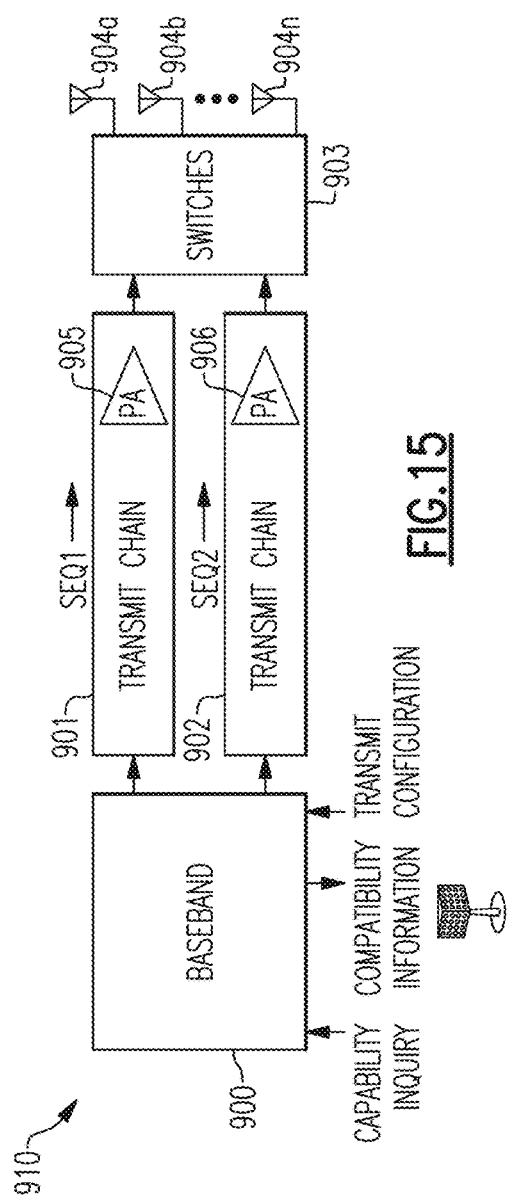
FIG. 15 is a schematic diagram of one embodiment of an RF communication system.

As shown in FIG. 6B, 15 kHz SCS operates with a first OFDM symbol that is 16TS (0.521 μs for SCS of 15 kHz) longer than each of the other symbols in the time slot. The table includes information for SCS of 15 kHz, 30 kHz, and 60 kHz. As shown in the table, symbol duration scales linearly with SCS.

Figures 6C, 6D:
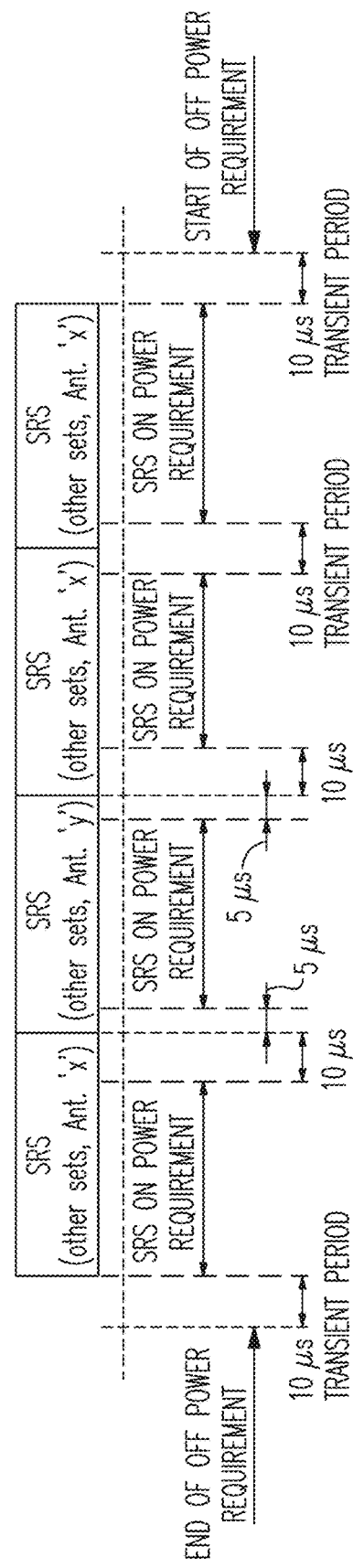
FIG. 6C is a table depicting one example of various communication parameters versus SCS.
FIG. 6D is a diagram of one example of ON to ON timing for SRS.

FIG. 6C is a table depicting one example of various communication parameters versus SCS.

In the example shown in FIG. 6C, CP scales linearly with SCS.

FIG. 6D is a diagram of one example of ON to ON timing for SRS.

As shown in FIG. 6D, SRS symbol used during switching (port 'y') is truncated by 5 μs+5 μs=10 μs. The first 5 μs CP duration at SCS of 15 kHz, while the second 5 μs arises from symbol impairment. Additionally, SRS symbols on prior and post switching transients suffer from 10 μs+5 μs=15 μs penalty.

ON to ON timing for consecutive SRS symbols is 15 μs for FR1 in Release 15 of 5G. For an SCS of 15 kHz, the CP is consumed and 10 μs of the preceding data symbol is consumed. At 30 kHz and 60 kHz SCS 15 μs of ON to ON timing corresponds to about half a symbol and a full symbol, respectively. Thus, a full symbol can be lost or blanked when 30 kHz or 60 kHz SCS is enabled.

Moreover, in Release 15, symbol blanking is the default assumption for all UE types. Thus, uRLLC performance is degraded when scheduler applies SRS default symbol blanking to all UE types.

In certain implementations, the UE provides binary reporting of SRS switching latency. In one example, the binary reporting includes four states: 0 μs/less than 3 μs/less than 5 μs/less than 15 μs. In certain implementations, binary reporting is provided per frequency band.

Figure 7A:
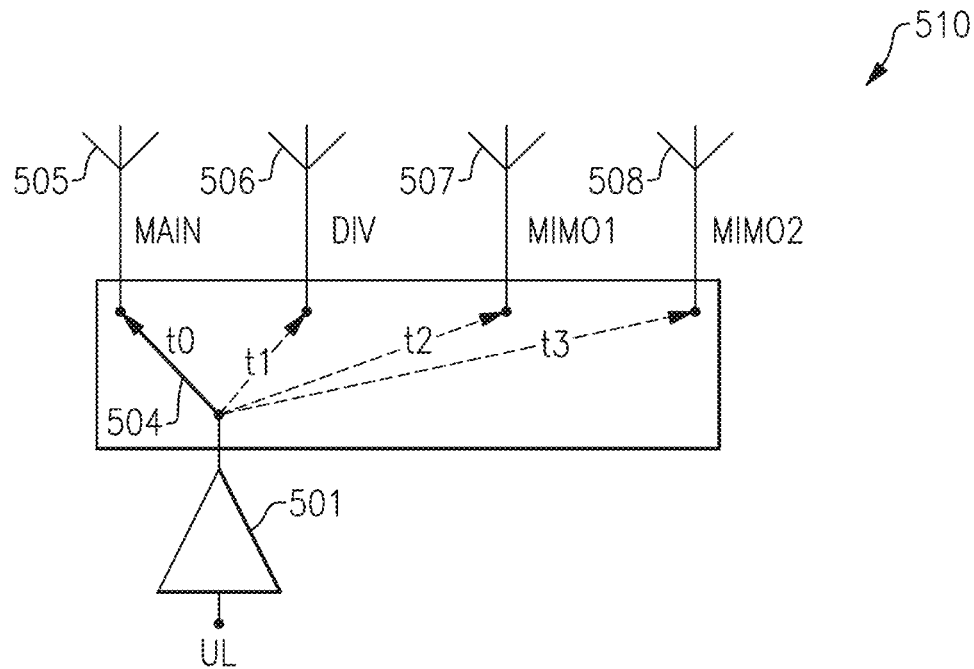
FIG. 7A is a schematic diagram of one example of a communication system operating with SRS for one transmit four receive (1T4R).
Figure 7B:
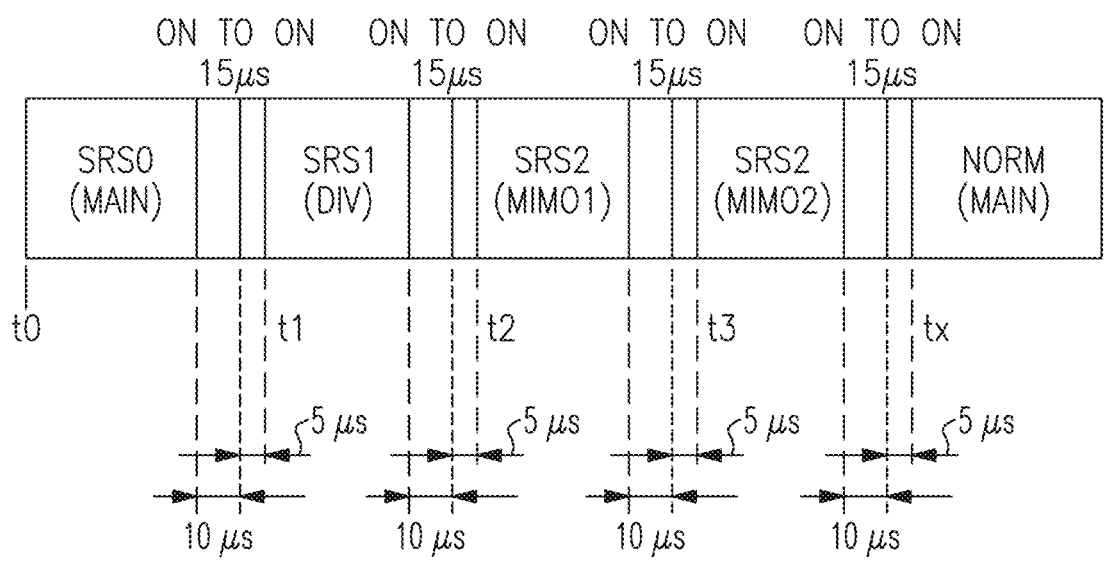
FIG. 7B is one example of a timing diagram for the communication system of FIG. 7A.

FIG. 7A is a schematic diagram of one example of a communication system 510 operating with SRS for one transmit four receive (1T4R). FIG. 7B is one example of a timing diagram for the communication system 510 of FIG. 7A.

With reference to FIGS. 7A and 7B, the communication system 510 includes a power amplifier 501 that is connected to a main antenna 505, a diversity antenna 506, a first MIMO antenna 507, and a second MIMO antenna 508 by a multi-throw switch 504.

When sounding all four antennas 505-508 at 15 kHz SCS, 4 symbols are used with whole CP and 10 μs of the preceding symbol affected. For 30 kHz and 60 kHz SCS, 7 symbols are used, 3 of which are blanks.

Figure 8A:
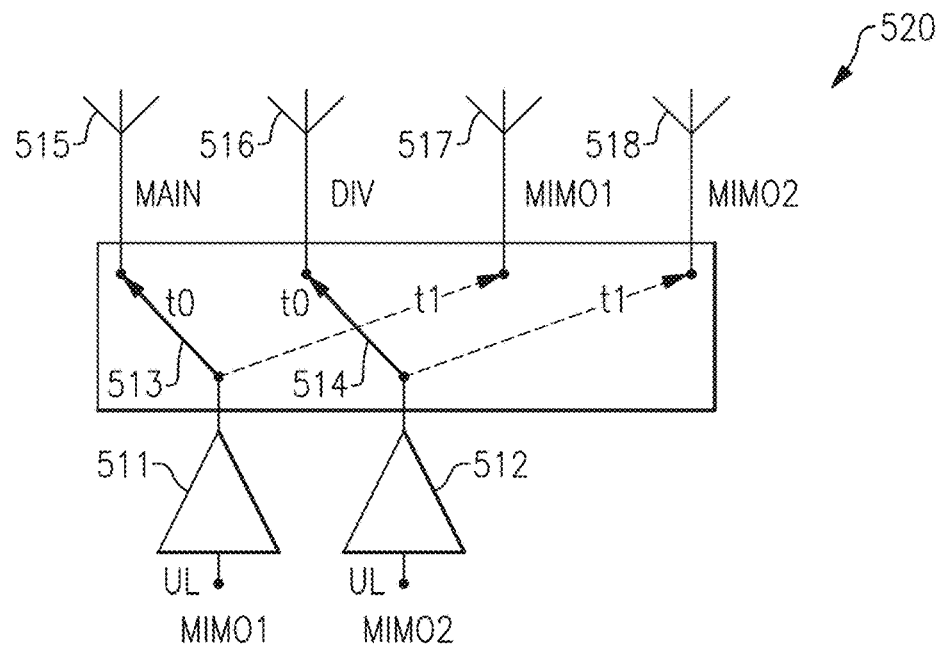
FIG. 8A is a schematic diagram of one example of a communication system operating with SRS for two transmit four receive (2T4R).
Figure 8B:
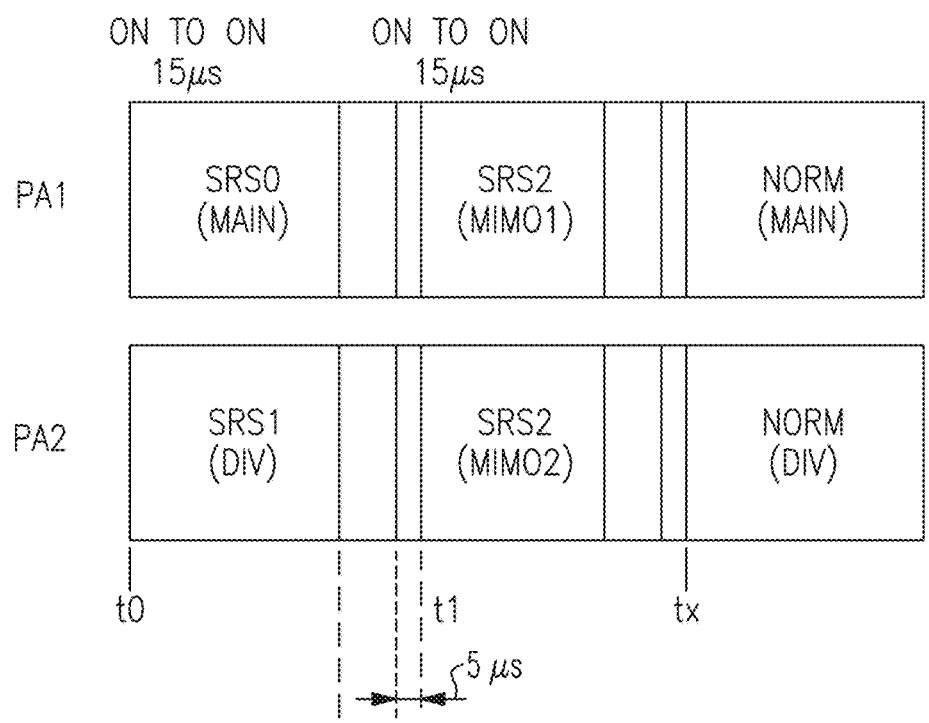
FIG. 8B is one example of a timing diagram for the communication system of FIG. 8A.

FIG. 8A is a schematic diagram of one example of a communication system 520 operating with SRS for two transmit four receive (2T4R). FIG. 8B is one example of a timing diagram for the communication system 520 of FIG. 8A.

With reference to FIGS. 8A and 8B, the communication system 520 includes a first power amplifier 511 that is connected to a main antenna 515 and a first MIMO antenna 517 by a first multi-throw switch 513. Additionally, the communication system 520 further includes a second power amplifier 512 that is connected to a diversity antenna 516 and a second MIMO antenna 518 by a second multi-throw switch 514.

When sounding all four antennas 515-518 at 15 kHz SCS, 2 symbols are used with whole CP and 10 μs of preceding symbol affected. For 30 kHz and 60 kHz SCS, 4 symbols are used, 2 of which are blanks.

Antenna Switching Utilizing Blank Symbols

FIG. 9A is a schematic diagram of one example of a communication system 630 operating with SRS for one transmit two receive (1T2R). The communication system 630 comprises a power amplifier 631 that connects to a first antenna ANT1 or a second antenna ANT2 through a switch 632. The RF signal received at the input to the power amplifier 631 is represented by the string of symbols, SYMBOL #1, SYMBOL #2, SYMBOL #3, and SYMBOL #4. Each symbol is preceded by an associated cycle prefix (CP). SYMBOL #3 is a SRS-AS symbol. SYMBOL #1, SYMBOL #2, SYMBOL #4 and the associated CPs are transmitted over ANT1 and the SRS-AS symbol, SYMBOL #3, is transmitted over ANT2. A gap in transmission occurs during antenna switching (also referred to herein as antenna swapping) from ANT1 to ANT2 before SRS-AS symbol transmission and during antenna switching from ANT2 to ANT1 after SRS-AS symbol transmission. If the gap in transmission is longer than a fraction of CP length, both SYMBOL #2 and SYMBOL #4 are partially or totally lost. The loss of data results in reduced throughput and higher latency. Currently, gap symbols (which can also be referred to as blank symbols) are allowed in 5G 3GPP specifications and replace the data in SYMBOL #2 and SYMBOL #4. The presence of gap symbols and loss of data is undesirable.

Antenna Switching without Blank Symbols

FIG. 9B is a schematic diagram of one example of a communication system 640 operating with SRS for one transmit two receive (1T2R). The communication system 640 comprises a power amplifier 641 that connects that connects to a first antenna ANT1 or a second antenna ANT2 through a switch 642. The RF signal received at the input to the power amplifier 641 is represented by the string of symbols, SYMBOL #1, SYMBOL #2, SYMBOL #3, and SYMBOL #4. Each symbol is preceded by an associated cycle prefix (CP). SYMBOL #3 is a SRS-AS symbol. SYMBOL #1, SYMBOL #2, SYMBOL #4 and the associated CPs are transmitted over ANT1 and the SRS-AS symbol, SYMBOL #3, is transmitted over ANT2. A gap in transmission occurs during antenna switching from ANT1 to ANT2 before SRS-AS symbol transmission and during antenna switching from ANT2 to ANT1 after SRS-AS symbol transmission. With a sufficiently short gap in transmission, both SYMBOL #2 and SYMBOL #4 can be successfully transmitted on ANT1. A small portion of CP #3 and CP #4 are affected by the short gap. Data loss is minimized.

Managing Power During Antenna Switching

Figure 10A:
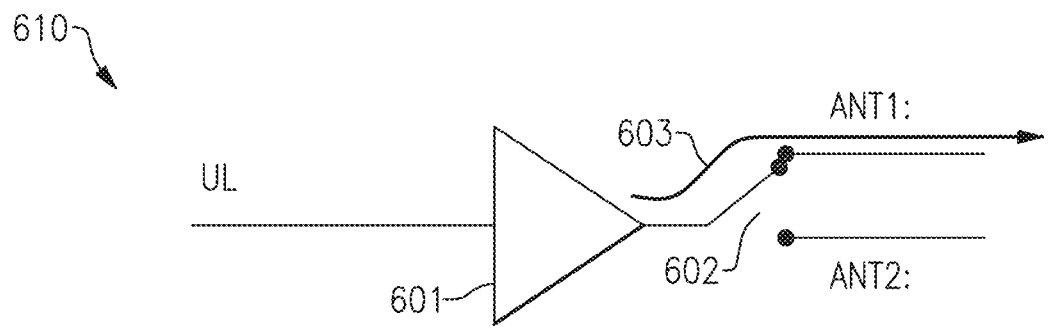
FIGS. 10A-10C are schematic diagrams of one example of a communication system illustrating RF power flow during an antenna swap.
Figure 10B:
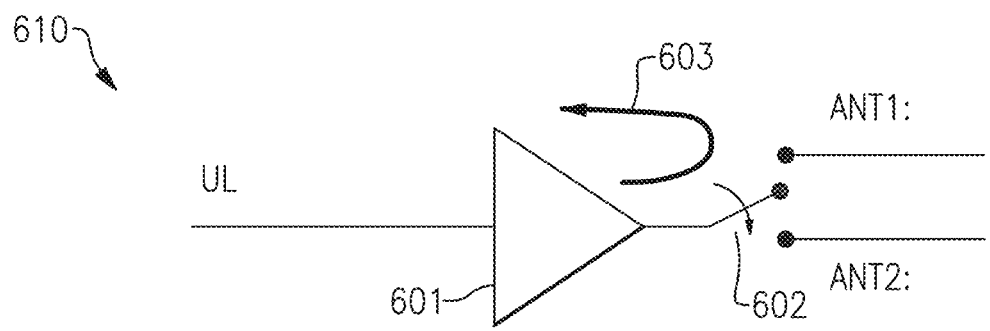
Figure 10C:
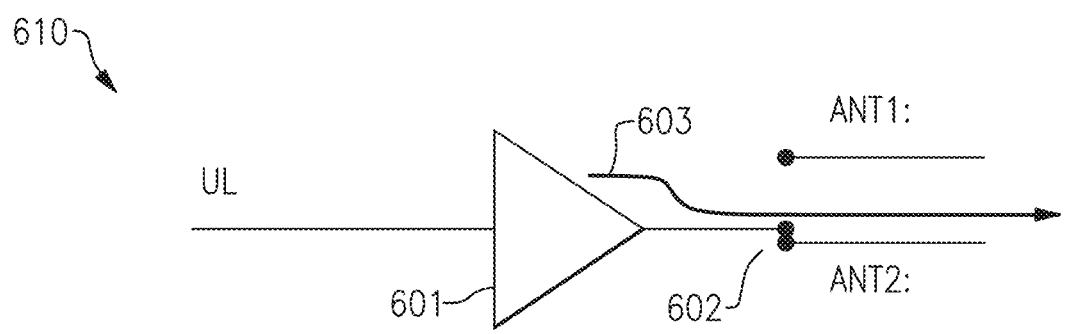

FIGS. 10A-10C are schematic diagrams of one example of a communication system 610 operating with SRS for one transmit two receive (1T2R). With reference to FIGS. 10A-10C, the communication system 610 includes a power amplifier 601 that connects to a first antenna ANT1 or a second antenna ANT2 through a switch 602. The path 603 represents the RF power flow associated with the RF signal from the power amplifier 601 during antenna switching to send a SRS symbol. If RF power is present during activation of the switch 602, it can be redirected and damage the power amplifier 601, the switch 602, and other front end circuitry, such as filters.

Referring to FIG. 10A, the switch 602 closes to make connection with the first antenna ANT1. The RF signal and accordingly the RF power associated with the RF signal goes through to the first antenna ANT1. Referring to FIG. 10C, the switch 602 closes to make connection with the second antenna ANT2. The RF signal and accordingly the RF power associated with the RF signal go through the second antenna ANT2.

Referring to FIG. 10B, the switch 602, during activation is not connected to either antenna, ANT1 or ANT2. The power amplifier 601 experiences an open circuit as the RF signal is re-directed from ANT1 to ANT2. Switch 602 is represented as having a throw and poles, as a mechanical switch is typically represented. Antenna switches are typically semiconductor switches and during the transition of the throw from one pole to another pole, some transistors are half on and others are half off. The antennas switch is transitioning from approximately 50 ohms, for example, to a high impedance, and back to approximately 50 ohms. When the antenna switch is properly closed, there is no or very little power in the switch. While the antenna switch is in transition, it acts as a resistor and power is the antenna switch during the transition causes heat which can damage the antenna switch.

The RF power, represented by indicator 603, has nowhere to go and can be redirected to the power amplifier 601 and other circuitry in the UE front end transmit chain, such as filters and the switch 602. During the transient time that the switch 602 is not making a connection with either antenna, ANT1 or ANT2, the undirected RF power can cause damage or reduce the reliability of the power amplifier 601 and the switch 602. Thus, it is desirable to control timing and RF power level to avoid or minimize impedance mismatch during antenna switching to send an SRS symbol.

Figure 11:
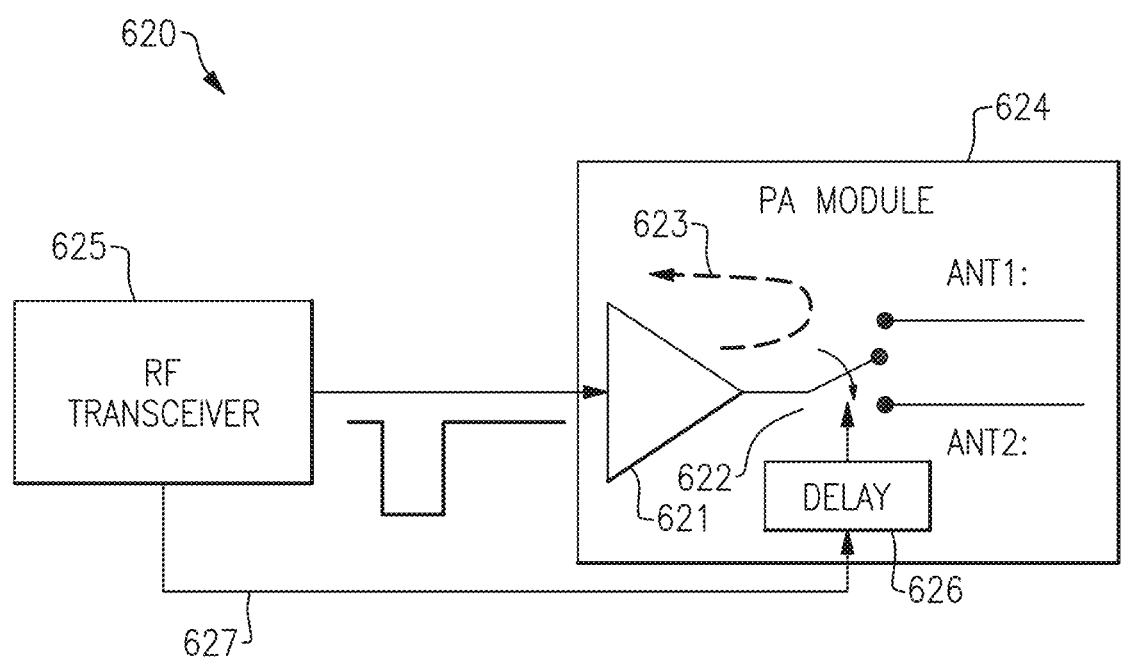
FIG. 11 is a schematic diagram illustrating one example of a communication system operating with SRS for one transmit two receive (1T2R) utilizing RF blanking to manage power during antenna switching.

FIG. 11 is a schematic diagram illustrating one example of a communication system 620 operating with SRS for one transmit two receive (1T2R). The communication system 620 includes an RF transceiver 625 that transmits RF signals and a control signal 627 to a power amplifier module (PA module) 624. The PA module 624 comprises a power amplifier 621 that receives the RF signal and connects to a first antenna ANT1 or a second antenna ANT2 through a switch 622. The PA module 624 further includes delay circuitry 626 that is configured to control the switch transition. To avoid or minimize impedance mismatch during antenna switching, the RF transceiver turns off the RF signal at an input to the PA module 624 (which can be referred to as RF blanking) and sends the control signal 627 to control the delay circuitry 626 which controls the switch 622. Indicator 623 represents the absence of RF power due to the RF blanking during the switch transition. The RF transceiver 625 reestablishes the RF signal after the switch 622 is in position. This method to manage the RF power during antenna switching, used by the communication system 620, provides that timing of the RF blanking corresponds closely or exactly with the timing of the opening and closing of the switch 622. The PA module 624 and the switch 622 can have an electrical delay that is not precisely known, which requires either calibration or a wider blanking to accommodate the unknown delay. Additionally, this method does not prevent accidental over power and damage to the power amplifier 621 should the RF blanking and control of the switch 621 not be properly synchronized. Thus, it is desirable to control timing and RF power level to avoid or minimize impedance mismatch during antenna switching to send an SRS symbol without turning off the RF signal at the input to the power amplifier.

Managing Power During Antenna Switching without Blanking Symbols

In certain implementations, to prevent high RF levels from being transmitted to the power amplifier output during an antenna switching event, the gain of the power amplifier is reduced during the antenna swapping event. This is accomplished inside a PA module after a single command is issued. In some implementations the single command is a MIPI command. In certain implementations, this is done as a self-sequenced mode, without any external control, allowing removal of timing guard bands related to externally sequenced controls. Antenna switching occurs without interrupting the input RF waveform, resulting in antenna swaps that are fast enough to occur in between symbols, rather than requiring a blank symbol time before and after the antenna swap.

Figure 12A:
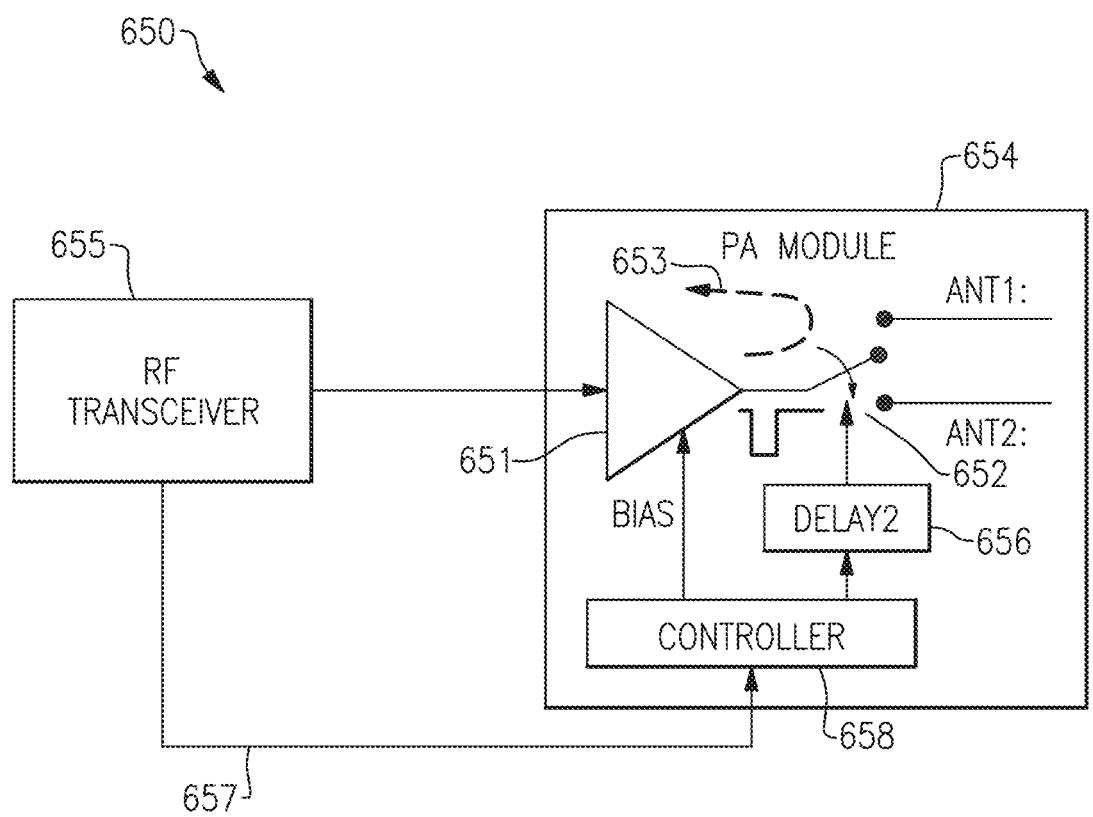
FIG. 12A is a schematic diagram of one example of a communication system operating with SRS for one transmit two receive (1T2R) that includes an internal controller to manage power and coordinate timing during antenna switching.

FIG. 12A is a schematic diagram of one example of a communication system 650 operating with SRS for one transmit two receive (1T2R). The communication system 650 includes an RF transceiver 655 that transmits RF signals and control signals 657 to a power amplifier module (PA module) 654. The PA module 654 comprises a power amplifier 651 that receives the RF signal and connects to a first antenna ANT1 or a second antenna ANT2 through a switch 652. The PA module 654 further includes delay circuitry 652 and a controller 658 that is configured to receive the control signals 657 from the RF transceiver 655. The controller 658 prevents or minimizes high RF levels from being transmitted to the power amplifier output during antenna switching. This can be referred to as hardware blanking which is indicated by the blanking symbol at the output of the power amplifier 651. The controller 658 is further configured to control the antenna switching via the delay circuitry 656.

In one example, the RF transceiver 655 sends a command for antenna swap. The RF transceiver 655 does not need to reduce the RF level across the switch transition. The controller 658, in response to receiving the command from the RF transceiver 655, initiates a sequence that occurs internal to the PA module 654. In one aspect, the controller 658 causes reduction in the power amplifier gain, for example, by reducing bias or other action on the power amplifier 651, before causing the switch 652 to transition and swap the antenna, and later re-establishes the gain of the power amplifier 651 for RF signal transmission. The switch 652 is not actuated while the RF power is not reduced. Advantageously, the sequence caused by the controller 658 does not depend on software and external delays to align the RF blanking and switch actuation. Further, because the controller is internal to the PA module 654, the sequence or method provides for short antenna swap transitions. The power reduction and switch actuation are controlled by the PA module's electronics, which can be designed with matching actuation delays.

In one example implementation, the single command from the RF transceiver 655 initiates a sequence stored in a register internal to the PA module 654. The command acts as a trigger word to initiate the sequence. This is much faster than receiving and implementing a series of individual commands from the RF transceiver to reduce the RF power at the power amplifier and actuate the antenna switch after the power reduction. Because triggering the sequence stored in the controller or register 656 is faster than implementing a series of commands from the UE, the SRS-AS symbol can be sent without blanking symbols before and after the SRS-AS symbol.

The transmission of the SRS-AS symbol is received by the base station and uses the information to model the network for transmission on the downlink from the base station to the UE. In an aspect, the network schedules the SRS-AS symbol transmission and does not schedule a symbol where network expects a blank symbol. For implementations described herein where the SRS-As symbol is sent without having to blank before and after, the UE informs the network that blank symbols before and after the SRS symbol are not needed.

Figure 12B:
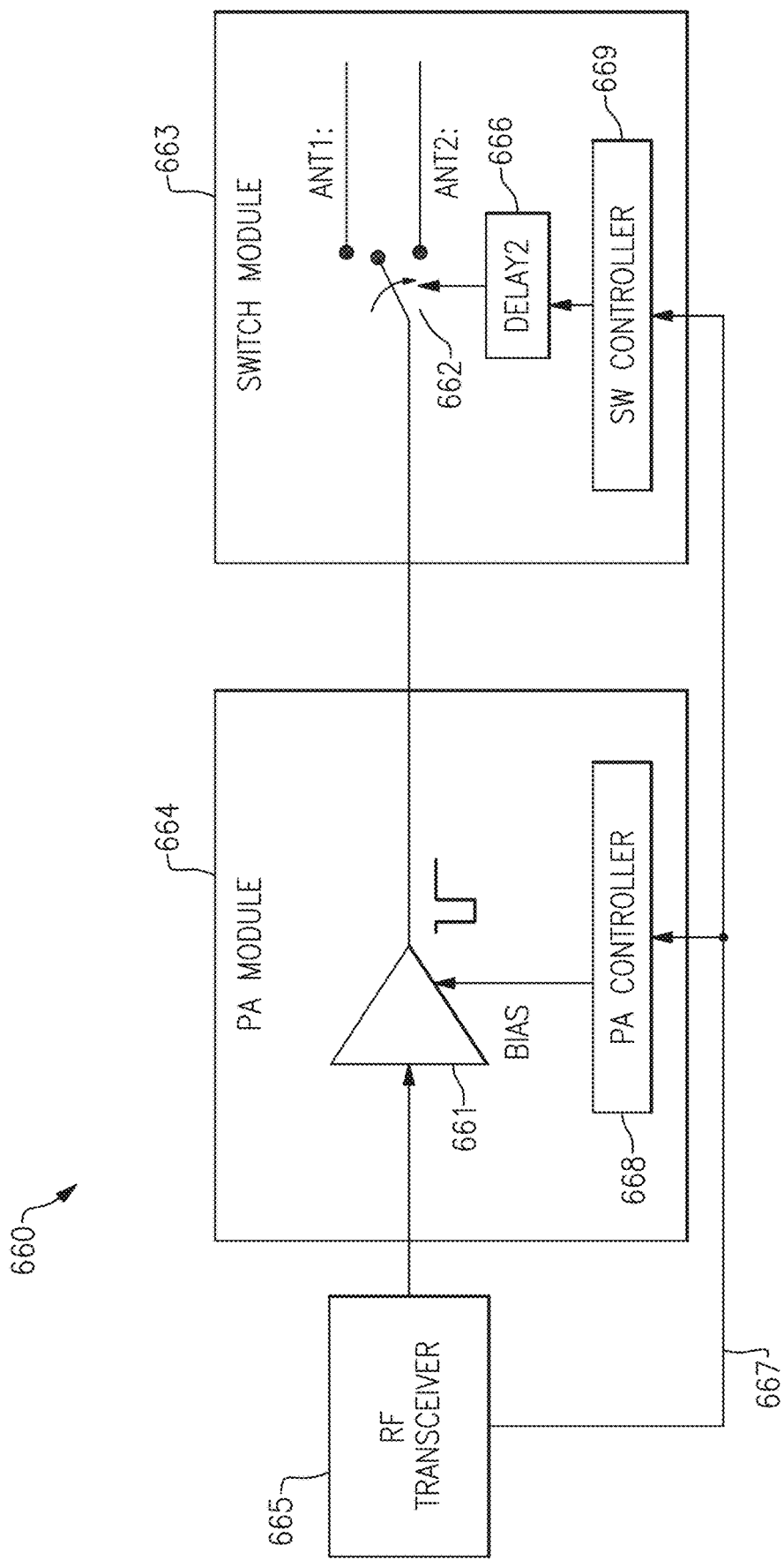
FIG. 12B is a schematic diagram of one example of a communication system operating with SRS for one transmit two receive (1T2R) that includes a PA module internal controller to manage power and a switching module internal controller to coordinate timing during antenna switching.

FIG. 12B is a schematic diagram of one example of a communication system 650 operating with SRS for one transmit two receive (1T2R). The communication system 660 is similar to the communication system 650 illustrated in FIG. 12A. However, instead of the power amplifier and antenna switch located in the same module, the power amplifier module includes a power amplifier and a separate module, the switch module, includes the antenna switch.

The communication system 660 includes an RF transceiver 665 that transmits RF signals and control signals 667 to a power amplifier module (PA module) 664 and switch module 663. The PA module 664 comprises a power amplifier 661 that receives the RF signal from the RF transceiver 665 and outputs an amplified RF signal from the power amplifier 661 for transmission, via switch 662, over a first antenna ANT1 or a second antenna ANT2. The PA module 664 further includes a PA controller 668 that prevents or minimizes high RF levels from being transmitted to the power amplifier output during antenna switching. The switch module 663 includes the switch 662 and receives the amplified RF signal from the PA module 664 for transmission over ANT1 or ANT2. The switch module 663 further includes a switch controller 669 that is configured to receive the control signals 667 from the RF transceiver 665 and control the antenna switching via the delay circuitry 666.

In one example, the RF transceiver 665 sends a command for antenna swap. The RF transceiver 665 does not need to reduce the RF level across the switch transition. The PA controller 668, in response to receiving the command from the RF transceiver 665, initiates a sequence that occurs internal to the PA module 664. In one aspect, the PA controller 668 causes reduction in the power amplifier gain, for example, by reducing bias or other action on the power amplifier 651, and later re-establishes the gain of the power amplifier 661 for RF signal transmission. The switch controller 669, in response to receiving the command from the RF transceiver 665, initiates a sequence that occurs internal to the switch module 663. The switch controller 669 causes, after the reduction in power amplifier gain, the switch 662 to transition and swap the antenna.

The switch 662 is not actuated while the RF power is not reduced. Advantageously, the sequences caused by the PA controller 668 and the switch controller 669 do not depend on software and external delays to align the RF blanking and switch actuation. Further, because the PA controller 668 is internal to the PA module 654 and the switch controller 669 is internal to the switch module 663, the sequences or methods provide for short antenna swap transitions. The power reduction is controlled by the PA module's electronics and the switch actuation is controlled by the switch module's electronics, which can be designed with matching actuation delays.

Figure 12C:
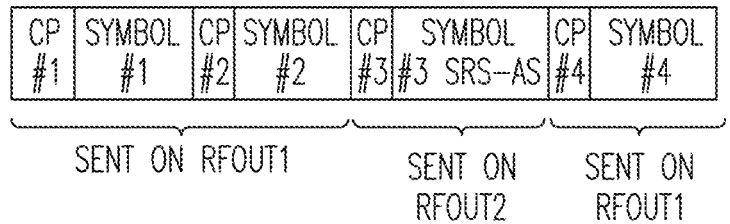
FIG. 12C is one example of a timing diagram for the communication system of FIG. 12D.
Figure 12D:
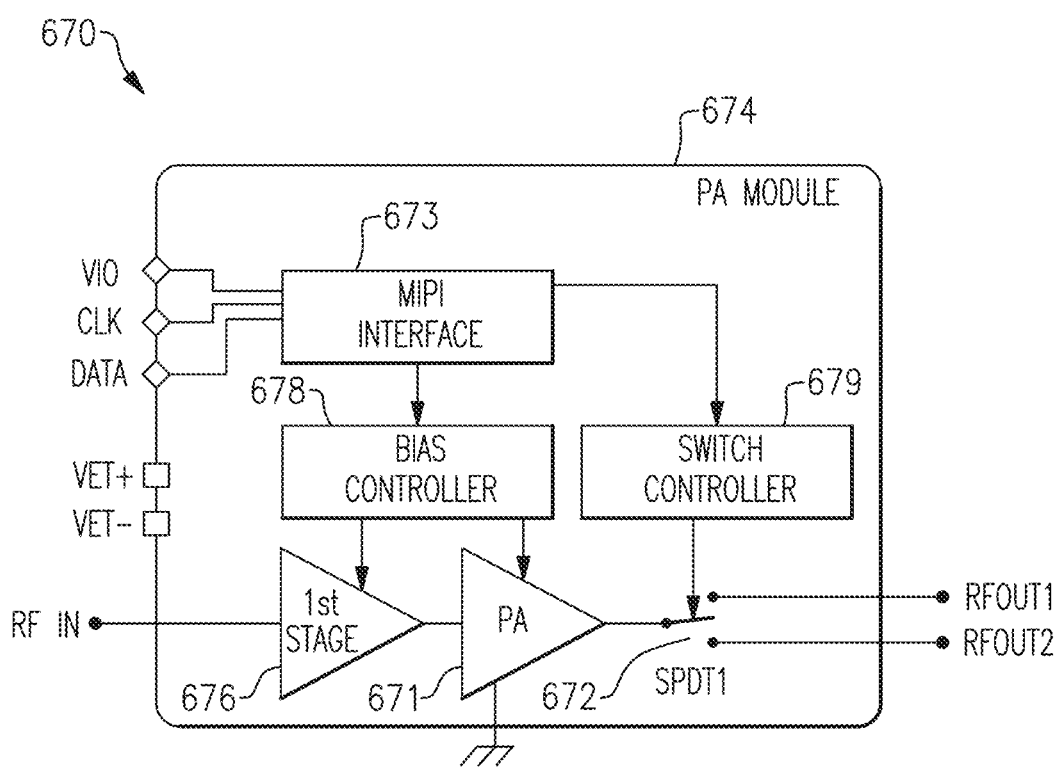
FIG. 12D is a schematic diagram of one example of a MIMO communication system operating with SRS for one transmit two receive (1T2R) with internal controllers to manage power and coordinate timing during antenna switching.

FIG. 12D is a schematic diagram of one example of a MIMO communication system 670 operating with SRS for one transmit two receive (1T2R). The RF input signal is amplified and portions of the amplified RF signal are output from RFOUT1 and other portion of the amplified RF signal are output from RFOUT2. FIG. 12C illustrates an RF signal for transmission by the communication system 670. The RF signal includes a sequence of symbols comprising SYMBOL #1, SYMBOL #2, SYMBOL #3, SYMBOL #4, and the associated cycle prefix (CP) preceding each symbol. SYMBOL #3 is an SRS-AS symbol. Referring to FIG. 12C, CP #1, SYMBOL #1, CP #2, SYMBOL #2, CP #4, and SYMBOL #4 are sent on RFOUT1 to a first antenna and the SRS-AS symbol is sent on RFOUT2 to a second antenna. The communication system 670 facilitates the reduction of gap times between transmissions on the different antennas, and provides a fast switch transition that avoids the need for a blank symbol before and after the SRS-AS symbol.

The communication system 670 comprises a PA module 674. The PA module 674 comprises a power amplifier that includes at least a first amplifying stage 676 and a final amplifying stage 671. The power amplifier receives an RF signal at RF IN and outputs an amplified RF signal for transmission, via switch 672, at RFOUT1 or RFOUT2. The PA module 674 further includes a mobile industry processor interface (MIPI) interface 673 that is configured to receive VIO, clock, and data signals, control the gain of the power amplifier via a bias controller 678, and control the switch actuation via a switch controller 679. The MIPI interface 673 utilizes an interface specification devised by the MIPI Alliance for mobile devices.

In an aspect, the MIPI interface 673 provides a command that generates a timing sequence within the PA module 674. The MIPI interface, in one example, provides a single command to initiate the timing sequence. The timing sequence causes the RF signal amplitude from the power amplifier to be reduced and after the RF signal amplitude is reduced, causes the switch 672 to actuate. Once the switch 672 has switched and is in communication with an output port, the appropriate portion of the RF signal is transmitted. The process can be repeated until all of the portions of the RF signal are transmitted over their respective antennas. The reduction in RF signal amplitude prevents or eliminates risk of damage to the power amplifier, switch 672, or other front circuitry, such as filters in the transmit chain and the like, during switching of the RF signal between the output ports RFOUT1 and RFOUT2, that serve two different antennas.

In another aspect, the bias controller 678, in response to receiving the command from the MIPI interface 673, controls the bias of one or more of the first amplifying stage 676, the final amplifying stage 671, or any intervening amplifying stages of the power amplifier to reduce the amplitude of the RF signal output from the power amplifier. In other examples, the bias controller 678 implements a low power mode or an off mode to achieve low RF power, below damage level, during the time when the switch is open. The switch controller 679, in response to receiving the command from the MIPI interface 673, actuates the switch 672 after the power amplifier system gain has been reduced. The communication system 670 advantageously ensures a fast single command transition which prevents over-power on at least the switch 672 and power amplifier. Because the MIPI interface 673 provides the command to initiate the sequence in the PA module 674, the sequence is insensitive to clock timing errors on the MIPI interface 673. Because the switch transition is fast, the communication system 670 does not utilize a blank symbol before and after the SRS-AS symbol.

In another aspect, one or more of the bias and the low power mode of the power amplifier are controlled through the digital MIPI interface 673 to reduce RF power during the antenna switching. Timers, such as digital timers, in the MIPI interface 673 are used to prevent the antenna switch 672 from being actuated before the RF gain of the power amplifier is reduced.

The 5G specification documents SRS-AS signals being received by more than two antennas. Implementations described herein illustrate two ports or two antennas for simplification, but are not limited two ports or two antennas. In other implementations, the communications systems comprise controllers that control the gain of one or more power amplifiers that include one or more amplifying stages and/or control activation of switches that switch between a plurality of antennas.

There are many different implementations to implement the controls and actuators to realize the critical RF power self-blanking before switching in the modules of the communication systems described herein. Power amplifiers typically include a bias control. To lower the amplifier gain, in one aspect, the internal controller reduces the bias on the amplifier. When the bias is sufficiently reduced, the gain is lowered. In an alternative aspect, the power amplifier can be turned off during antenna switching. Power amplifiers often have a low power mode. The low power mode may use a shunt switch across RF stages. In some aspects, the internal controllers control the shunt switch to reduce RF power during antenna switching. For example, the shunt switch is an input switch at the input to the power amplifier or is an inter-stage switch that shunts one or more amplifying stages of the power amplifier. Circuit branching can also be used.

In another example, the antenna switch, which may be a separate sub-system on the PA module or the switching module, includes an output that provides a signal to indicate the antenna switch has completed the switching transition. The internal controllers, in response to receiving the indication that the antenna switch has completed the switching transition, cause the re-establishment of the RF signal.

In another aspect, the antenna switching is performed during at least a portion of the cycle prefix. The cycle prefix comprises information that is redundant because the cycle prefix information is repeated in the associated symbol. Altering the cycle prefix for up to approximately 50% of its duration is considered harmless to data quality.

In another aspect, the communication system comprises a make before break switching scheme to reduce RF or impedance mismatch at the output of the power amplifier during the antenna switching. For example, during the make before break switching scheme, the load on the power amplifier is approximately 25 ohms or less if the antenna switch has multiple branches for the duration of the switch transition. This may cause acceptable distortion of the RF signal for a very short amount of time.

Another aspect extends the make before break implementation by diverting the RF power from the power amplifier to a load while waiting for the antenna switch to settle after actuation. This implementation provides advantages when the antenna switch serves more than two outputs or antennas and has a more complicated switching structure. Diverting the RF power to a load is an easier implementation than the make before break implementation for an antenna switch with more than two poles and is optimally fast to allow SRS-AS without blanking symbols or lost data.

Implementations herein illustrate, but are not limited to, SRS symbols in the same band. In other implements, the SRS symbols are in different bands and the front end comprises a plurality of power amplifiers, where each power amplifier is associated with a different band. In an aspect, the bands are transmitted over a single antenna. In one implementation, for example, the controller internal to the PA module, triggered by a single command from the UE, implements a sequence that stops the transmitter and power amplifier associated with a first band, initiates the transmitter and power amplifier associated with the second band to transmit the SRS symbol without blank symbols, and re-establishes the transmitter and power amplifier associated with the first band using methods described herein. In another aspect, each band is transmitted over a corresponding unique antenna. In such an implementation, the controller internal to the PA module, in addition to controlling the transmitter and power amplifier, controls the actuation of the antenna switch using one or more of the methods described herein.

Figure 13:
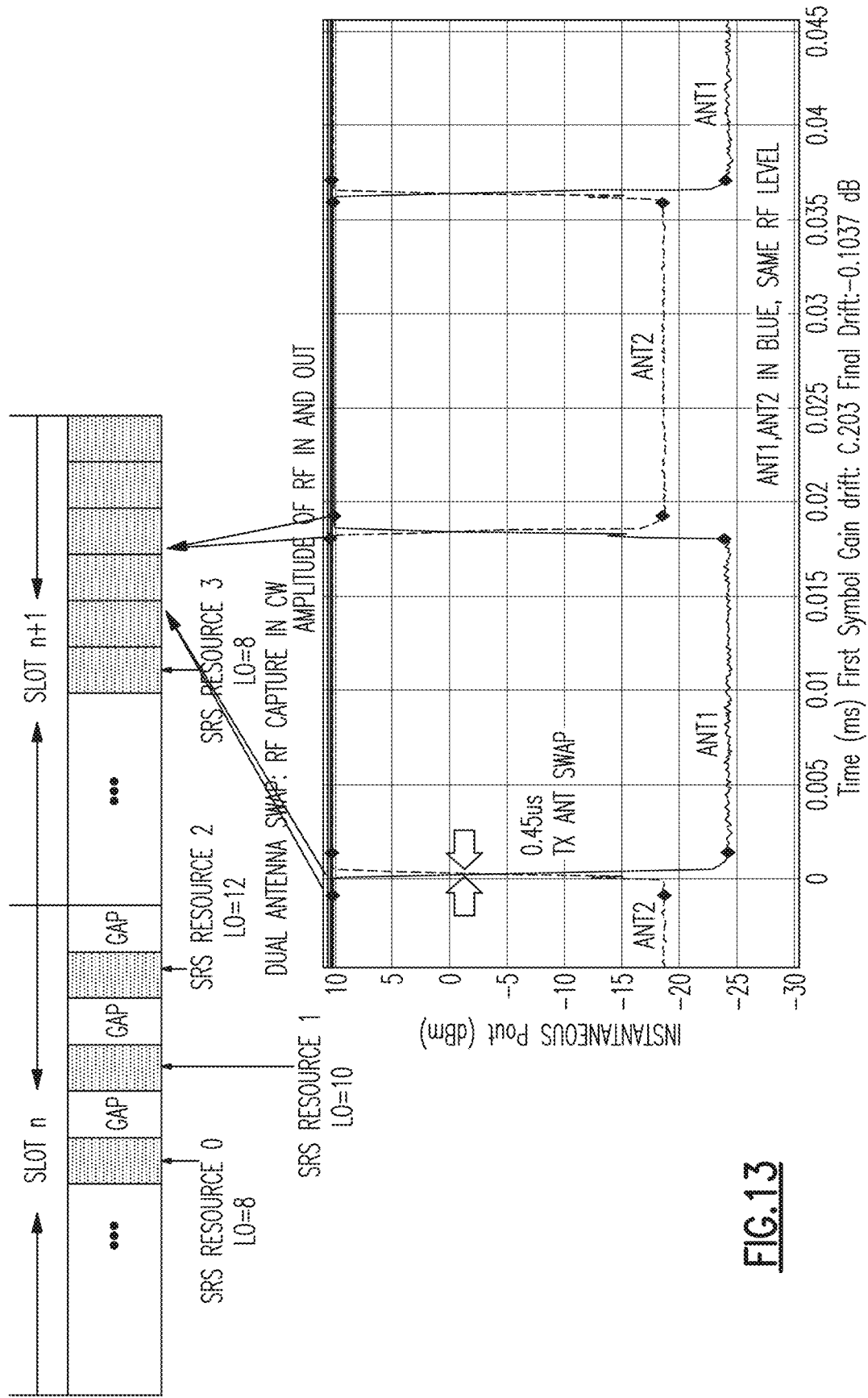
FIG. 13 is a graph of illustrating one example of RF power versus time for fast antenna swapping.

FIG. 13 is a graph of illustrating one example of RF power versus time for fast antenna swapping. Single SRS symbols are sent on different antennas. The x-axis represents time in milliseconds (ms) and the y-axis represents the instantaneous power out in dBm. For the illustrated embodiment, the antenna switching time is approximately 0.45 microseconds. Thus, no gap in between RF symbols is needed.

Figure 14:
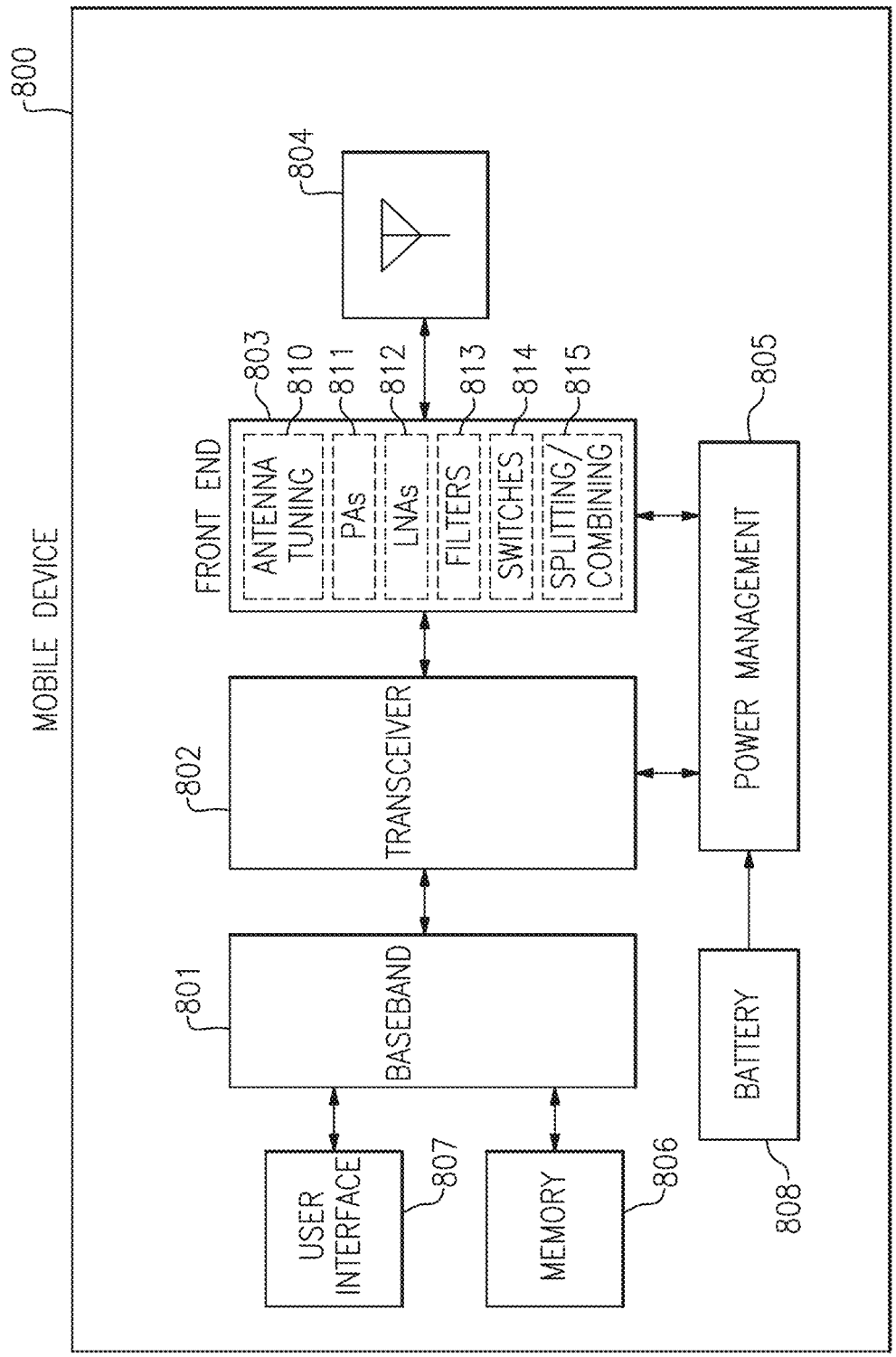
FIG. 14 is a schematic diagram of one embodiment of a mobile device.

FIG. 14 is a schematic diagram of one embodiment of a mobile device 800. The mobile device 800 includes a baseband system 801, a transceiver 802, a front end system 803, antennas 804, a power management system 805, a memory 806, a user interface 807, and a battery 808. The mobile device 800 can be implemented in accordance with any of the embodiments herein.

The mobile device 800 can be used communicate using a wide variety of communications technologies, including, but not limited to, 2G, 3G, 4G (including LTE, LTE-Advanced, and LTE-Advanced Pro), 5G NR, WLAN (for instance, WiFi), WPAN (for instance, Bluetooth and ZigBee), WMAN (for instance, WiMax), and/or GPS technologies.

The transceiver 802 generates RF signals for transmission and processes incoming RF signals received from the antennas 804. It will be understood that various functionalities associated with the transmission and receiving of RF signals can be achieved by one or more components that are collectively represented in FIG. 14 as the transceiver 802. In one example, separate components (for instance, separate circuits or dies) can be provided for handling certain types of RF signals.

The front end system 803 aids is conditioning signals transmitted to and/or received from the antennas 804. In the illustrated embodiment, the front end system 803 includes antenna tuning circuitry 810, power amplifiers (PAs) 811, low noise amplifiers (LNAs) 812, filters 813, switches 814, and signal splitting/combining circuitry 815. However, other implementations are possible.

For example, the front end system 803 can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

In certain implementations, the mobile device 800 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antennas 804 can include antennas used for a wide variety of types of communications. For example, the antennas 804 can include antennas for transmitting and/or receiving signals associated with a wide variety of frequencies and communications standards.

In certain implementations, the antennas 804 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

The mobile device 800 can operate with beamforming in certain implementations. For example, the front end system 803 can include amplifiers having controllable gain and phase shifters having controllable phase to provide beam formation and directivity for transmission and/or reception of signals using the antennas 804. For example, in the context of signal transmission, the amplitude and phases of the transmit signals provided to the antennas 804 are controlled such that radiated signals from the antennas 804 combine using constructive and destructive interference to generate an aggregate transmit signal exhibiting beam-like qualities with more signal strength propagating in a given direction. In the context of signal reception, the amplitude and phases are controlled such that more signal energy is received when the signal is arriving to the antennas 804 from a particular direction. In certain implementations, the antennas 804 include one or more arrays of antenna elements to enhance beamforming.

The baseband system 801 is coupled to the user interface 807 to facilitate processing of various user input and output (I/O), such as voice and data. The baseband system 801 provides the transceiver 802 with digital representations of transmit signals, which the transceiver 802 processes to generate RF signals for transmission. The baseband system 801 also processes digital representations of received signals provided by the transceiver 802. As shown in FIG. 14, the baseband system 801 is coupled to the memory 806 of facilitate operation of the mobile device 800.

The memory 806 can be used for a wide variety of purposes, such as storing data and/or instructions to facilitate the operation of the mobile device 800 and/or to provide storage of user information.

The power management system 805 provides a number of power management functions of the mobile device 800. In certain implementations, the power management system 805 includes a PA supply control circuit that controls the supply voltages of the power amplifiers 811. For example, the power management system 805 can be configured to change the supply voltage(s) provided to one or more of the power amplifiers 811 to improve efficiency, such as power added efficiency (PAE).

As shown in FIG. 14, the power management system 805 receives a battery voltage from the battery 808. The battery 808 can be any suitable battery for use in the mobile device 800, including, for example, a lithium-ion battery.

FIG. 15 is a schematic diagram of one embodiment of an RF communication system 910. The RF communication system 910 includes a baseband system 900, a first transmit chain 901, a second transmit chain 902, switches 903, and antennas 904a, 904b, . . . 904n. The RF communication system 910 represents a wireless device of a cellular network, such as a mobile phone. The RF communication system 910 can be implemented in accordance with any of the embodiments herein.

As shown in FIG. 15, the baseband system 900 generates a first transmit signal and a second transmit signal, which in certain implementations are represented each using a pair of in-phase (I) and quadrature-phase (Q) signals.

With continuing reference to FIG. 15, the first transmit chain 901 includes a first power amplifier 905, and the second transmit chain 902 includes a second power amplifier 906. The first power amplifier 905 is used to amplify a first RF transmit signal carrying a first sequence of symbols (SEQ1). Additionally, the second power amplifier 906 is used to amplify a second RF transmit signal carrying a second sequence of symbols (SEQ2).

As shown in FIG. 15, the switches 903 are used to selectively connect the first power amplifier 905 and the second power amplifier 906 to desired antenna(s) chosen from the antennas 904a, 904b, . . . 904n. Although the RF communication system 910 is depicted as included three antennas, more or fewer antennas can be included as indicated by the ellipses.

The baseband system 900 controls generation of the trigger command that triggers the controllers in the power amplifiers 905, 906 to reduce the power amplifier gain during actuation of switch 903 to transmit the SRS-AS symbol without blank symbols before and after and protecting the power amplifiers 905, 906, switches 903 and other circuitry in the transmit chains 901, 902 from over-voltage according to the teachings herein.

As shown in FIG. 15, the baseband system 900 is further configured to receive a base station capability inquiry from a base station, and to control transmission of capability information to the base station in response to the base station capability inquiry. In certain implementations, the baseband system 900 can further receive transmit configuration information from the base station in response to sending the compatibility information. The baseband system 900 can configure first transmit chain 901, second transmit chain 902, and/or the switches 903 based on the inquiry and/or transmit configuration information.

Figure 16:
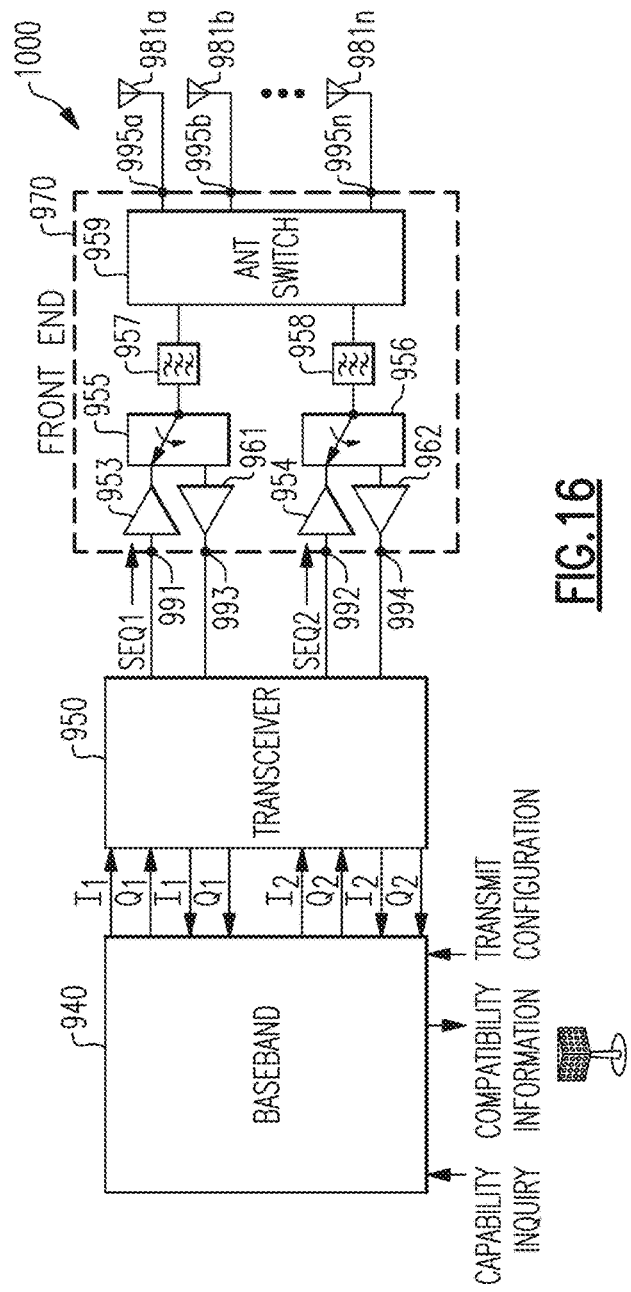
FIG. 16 is a schematic diagram of another embodiment of an RF communication system.

FIG. 16 is a schematic diagram of another embodiment of an RF communication system 1000. The RF communication system 1000 includes a baseband system 940, a transceiver 950, a front end system 970, and antennas 981a, 981b, . . . 981n. The RF communication system 1000 represents a wireless device of a cellular network, such as a mobile phone. The RF communication system 1000 can be implemented in accordance with any of the embodiments herein.

As shown in FIG. 16, the baseband system 940 generates a first pair of in-phase (I) and quadrature-phase (Q) signals representing a first transmit signal. Additionally, the baseband system 940 processes a first pair of I and Q signals representing a first receive signal. Furthermore, the baseband system 940 generates a second pair of I and Q signals representing a second transmit signal. Additionally, the baseband system 940 processes a second pair of I and Q signals representing a second receive signal.

With continuing reference to FIG. 16 the transceiver 950 modulates the first pair of I and Q signals representing the first transmit signal to generate a first RF transmit signal provided to the front end system 970 at a first transmit terminal 991. The first RF transmit signal carries a first sequence of symbols (SEQ1). Additionally, the transceiver 950 demodulates a first RF receive signal from a first receive terminal 993 of the front end system 970 to generate the first pair of I and Q signals representing the first receive signal. Furthermore, the transceiver 950 modulates the second pair of I and Q signals representing the second transmit signal to generate a second RF transmit signal provided to the front end system 970 at a second transmit terminal 992. The second RF transmit signal carriers a second sequence of symbols (SEQ2). Additionally, the transceiver 970 demodulates a second RF receive signal from a second receive terminal 994 of the front end system 970 to generate the second pair of I and Q signals representing the second receive signal.

As shown in FIG. 16, the front end system 970 includes a first power amplifier 953, a second power amplifier 954, a first transmit/receive switch 955, a second transmit/receive switch 956, a first band filter 957, a second band filter 958, an antenna switch 959, a first low noise amplifier 961, and a second low noise amplifier 962.

Although one embodiment of a front end system 970 is shown, other implementations of front end systems are possible. For example, a wide range of components and circuitry can be present between an output of a power amplifier and an antenna. Examples of such components and circuitry include, but are not limited to, switches, matching networks, harmonic termination circuits, filters, resonators, duplexers, detectors, directional couplers, bias circuitry, and/or frequency multiplexers (for instance, diplexers, triplexers, etc.). Furthermore, multiple instantiations of one or more components or circuits can be included. Moreover, a wide range of components and circuitry can be present between the transceiver and an input to a power amplifier.

As shown in FIG. 16, the antenna switch 959 is used to selectively connect the first power amplifier 953 and the second power amplifier 954 to desired antenna(s) chosen from the antennas 981a, 981b, . . . 981n. The front end system 970 is coupled to the antennas 981a, 981b, . . . 981n at antenna terminals 995a, 995b, . . . 995n, respectively. Although the RF communication system 1000 is depicted as included three antennas, more or fewer antennas can be included as indicated by the ellipses.

In the illustrated embodiment, the RF communication system 1000 includes a first transmit path through the first power amplifier 953 and a second transmit path through the second power amplifier 954. The first transmit path is for the first RF transmit signal carrying the first sequence of symbols (SEQ1) and the second transmit path is for the second RF transmit signal carrying the second sequence of symbols (SEQ2).

The baseband system 940 controls generation of the trigger command that triggers the controllers in the front end 970 to reduce the power amplifier gain of power amplifiers 953, 954 during actuation of antenna switch 959 to transmit the SRS-AS symbol without blank symbols before and after and protecting the power amplifiers 953, 954, antenna switch 959 and other circuitry in the transmit chain from over-voltage according to the teachings herein.

As shown in FIG. 16, the baseband system 940 is further configured to receive a base station capability inquiry from a base station, and to control transmission of capability information to the base station in response to the base station capability inquiry. In certain implementations, the baseband system 940 can further receive transmit configuration information from the base station. The baseband system 940 can configure the transceiver 950 and/or the front end system 970 based on the inquiry and/or transmit configuration information.

Applications

Some of the embodiments described above have provided examples in connection with mobile devices. However, the principles and advantages of the embodiments can be used for a wide range of RF communication systems. Examples of such RF communication systems include, but are not limited to, mobile phones, tablets, base stations, network access points, customer-premises equipment (CPE), laptops, and wearable electronics.

Terminology

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "may," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method of sounding reference signal switching in a mobile device, the method comprising:
   with a packaged front end module of the mobile device, transmitting a sequence of symbols using a transmit path through a power amplifier and antenna switch to a first antenna;
   receiving a command at an interface of the packaged front end module, the command generated at a baseband system;
   in response to receiving the command at the interface of the packaged front end module, with circuitry of the packaged front end module, and without external control, causing: reduced gain of the power amplifier, initiation of a switching delay in response to the reduced gain of the power amplifier, and actuation of the antenna switch to switch to a second antenna after the switching delay; and subsequent to actuation of the antenna switch, transmitting a sounding reference signal symbol using the transmit path through the power amplifier and the antenna switch to the second antenna.

2. The method of claim 1 wherein the sequence of symbols includes a sounding reference signal.

3. The method of claim 1 wherein the command initiates sounding reference signal switching.

4. The method of claim 1 wherein the antenna switch is open for a portion of the actuation of the antenna switch.

5. The method of claim 1 wherein the antenna switch makes connection with the second antenna before breaking a connection with the first antenna during the actuation of the antenna switch.

6. A mobile device comprising:

a baseband system configured to generate a sequence of symbols for transmission to a first antenna and a command to initiate sounding reference signal switching; and a front end module including a module package, a power amplifier within the module package, and a switch within the module package configured to switch between the first antenna and a second antenna, the front end module configured to, in response to receiving the command at an interface of the front end module, and without external control, reduce gain of the power amplifier, initiate a switching delay, after the switching delay, switch the switch from the first antenna to the second antenna, and transmit a sounding reference signal symbol on the second antenna through the power amplifier and the switch.

7. The mobile device of claim 6 wherein the command is received at a mobile industry processor interface within the front end module.

8. The mobile device of claim 6 wherein switching of switch occurs during a cycle prefix associated with the sounding reference signal symbol.

9. The mobile device of claim 6 wherein receipt of the command initiates a sequence stored in a register internal to the front end module.

10. The mobile device of claim 6 wherein the front end module further includes a power amplifier module that includes the power amplifier and a first controller, the front end module further including a switch module that includes the switch and a second controller.

11. The mobile device of claim 10 wherein the first controller is configured to reduce the gain of the power amplifier in response to receiving the command.

12. The mobile device of claim 10 wherein the second controller is configured to initiate the delay and switch the switch in response to receiving the command.

13. The mobile device of claim 6 wherein the front end module further includes a controller that is configured to receive the command and initiate an ordered set of actions in response to receiving the command.

14. The mobile device of claim 6 wherein transmission of the sounding reference signal symbol occurs without transmitting a blank symbol before and after the sounding reference signal symbol.

15. The mobile device of claim 6 wherein the switching of the switch occurs during a cycle prefix associated with the sounding reference signal symbol.

16. The mobile device of claim 6 wherein the baseband system notifies a base station in a communication network that the sounding reference signal symbols are transmitted without preceding and following blank symbols.

17. A front end system comprising:

a module package;

a power amplifier within the module package configured to provide an amplified radio frequency signal at a switch input for transmission to a first antenna terminal;

an antenna switch within the module package configured to receive the amplified radio frequency signal at the switch input and switch between the first antenna terminal and a second antenna terminal; and a controller within the module package configured, in response to a trigger word received at an interface of the front end module and, and without external control, reduce gain of the power amplifier, initiate a switching delay, and cause, after the switching delay, actuation of the antenna switch, such that following actuation, the switch input of the switch is in communication with the second antenna terminal, the controller further configured to cause transmission of a sounding reference signal symbol through the power amplifier and the antenna switch to the second antenna terminal.

18. The front end system of claim 17 wherein reducing the gain of the power amplifier includes lowering a bias of the power amplifier.

19. The front end system of claim 18 wherein lowering the bias of the power amplifier includes lowering the bias of one or more amplifying stages of the power amplifier.

20. The front end system of claim 17 wherein the controller includes a sequence register.

* * * * *